(12) United States Patent
Choi et al.

(10) Patent No.: US 10,819,414 B2
(45) Date of Patent: Oct. 27, 2020

(54) METHODS AND DEVICES FOR BEAM TRACKING

(71) Applicant: Intel Corporation, Santa Clara, CA (US)

(72) Inventors: Yang-Seok Choi, Portland, OR (US); Venkatesan Nallampatti Ekambaram, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 72 days.

(21) Appl. No.: 15/935,106

(22) Filed: Mar. 26, 2018

(65) Prior Publication Data

US 2019/0296821 A1    Sep. 26, 2019

(51) Int. Cl.
*H04B 7/08*    (2006.01)
*H04B 7/00*    (2006.01)
*H04B 7/01*    (2006.01)
*H04B 7/06*    (2006.01)

(52) U.S. Cl.
CPC ............. *H04B 7/086* (2013.01); *H04B 7/00* (2013.01); *H04B 7/06* (2013.01); *H04B 7/0697* (2013.01)

(58) Field of Classification Search
CPC ... H04B 7/00; H04B 7/01; H04B 7/06; H04B 7/0697
See application file for complete search history.

(56) References Cited

U.S. PATENT DOCUMENTS

| | | | | |
|---|---|---|---|---|
| 5,796,779 A * | 8/1998 | Nussbaum | ........... | H04B 7/0854 375/267 |
| 6,115,409 A * | 9/2000 | Upadhyay | ........... | H01Q 3/2605 370/487 |
| 2002/0054621 A1 * | 5/2002 | Kyeong | ........... | H04B 7/0897 375/147 |
| 2003/0146870 A1 * | 8/2003 | Guo | ........... | H04B 7/0851 342/383 |
| 2008/0188186 A1 * | 8/2008 | Hwang | ........... | H04B 7/0808 455/69 |
| 2009/0048824 A1 * | 2/2009 | Amada | ........... | G10L 21/0208 704/10 |
| 2020/0127717 A1 * | 4/2020 | Osterling | ........... | H04B 10/25758 |

OTHER PUBLICATIONS

Arulampalam et al.: "A Tutorial on Particle Filters for Online Nonlinear/Non-Gaussian Bayesian Tracking." IEEE Transactions on signal processing, Feb. 2002, pp. 174-188, vol. 50, No. 2.

* cited by examiner

*Primary Examiner* — Sam K Ahn
*Assistant Examiner* — Amneet Singh
(74) *Attorney, Agent, or Firm* — Viering, Jentschura & Partner MBB

(57) ABSTRACT

A wireless communication device according to some aspects includes an output determiner configured to determine first weighted signals for a plurality of antennas with first beamforming weights, a selector configured to select, from the plurality of antennas, a reference antenna based on signal powers of the first weighted signals, a weight controller configured to determine second beamforming weights for a predetermined number of antennas of the plurality of antennas based on a difference between the first weighted signal of the reference antenna and the first weighted signals of the predetermined number of antennas, the output determiner further configured to determine second weighted signals for the plurality of antennas with the second beamforming weights.

16 Claims, 14 Drawing Sheets

METHODS AND DEVICES FOR BEAM TRACKING

TECHNICAL FIELD

Various embodiments relate generally to methods and devices for beam tracking.

BACKGROUND

Various radio communication technologies use beamforming to improve transmit and/or receive gain. This can become important in use cases involving dynamic movement, where the direction between a transmitter and receiver may change over time. Focusing on the receive direction, the receiver may attempt to track the direction of the transmitter over time and apply beamforming at its antenna array to improve the receive gain in this direction.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
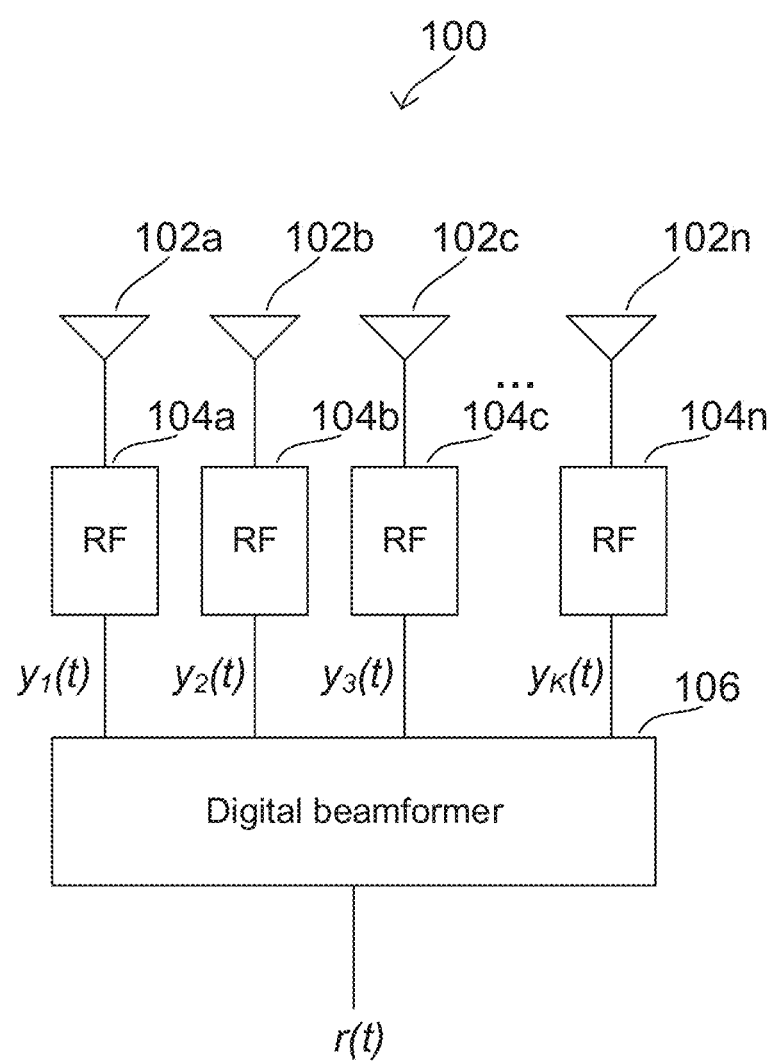
FIG. 1 shows an exemplary configuration of a wireless communication device according to some aspects.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e. one or more. Any term expressed in plural form that does not expressly state "plurality" or "multiple" likewise refers to a quantity equal to or greater than one. The terms "proper subset", "reduced subset", and "lesser subset" refer to a subset of a set that is not equal to the set, i.e. a subset of a set that contains less elements than the set.

Any vector and/or matrix notation utilized herein is exemplary in nature and is employed solely for purposes of explanation. Accordingly, aspects of this disclosure accompanied by vector and/or matrix notation are not limited to being implemented solely using vectors and/or matrices, and that the associated processes and computations may be equivalently performed with respect to sets, sequences, groups, etc., of data, observations, information, signals, samples, symbols, elements, etc.

As used herein, "memory" are understood as a non-transitory computer-readable medium in which data or information can be stored for retrieval. References to "memory" included herein may thus be understood as referring to volatile or non-volatile memory, including random access memory (RAM), read-only memory (R$\phi$(t)), flash memory, solid-state storage, magnetic tape, hard disk drive, optical drive, etc., or any combination thereof. Furthermore, registers, shift registers, processor registers, data buffers, etc., are also embraced herein by the term memory. A single component referred to as "memory" or "a memory" may be composed of more than one different type of memory, and thus may refer to a collective component comprising one or more types of memory. Any single memory component may be separated into multiple collectively equivalent memory components, and vice versa. Furthermore, while memory may be depicted as separate from one or more other components (such as in the drawings), memory may also be integrated with other components, such as on a common integrated chip or a controller with an embedded memory.

The term "software" refers to any type of executable instruction, including firmware.

The term "terminal device" utilized herein refers to user-side devices (both portable and fixed) that can connect to a core network and/or external data networks via a radio access network. "Terminal device" can include any mobile or immobile wireless communication device, including User Equipments (UEs), Mobile Stations (MSs), Stations (STAs), cellular phones, tablets, laptops, personal computers, wearables, multimedia playback and other handheld or body-mounted electronic devices, consumer/home/office/commercial appliances, vehicles, and any other electronic device capable of user-side wireless communications. Without loss of generality, in some cases terminal devices can also include application-layer components, such as application processors or other general processing components, that are directed to functionality other than wireless communications. Terminal devices can optionally support wired communications in addition to wireless communications. Furthermore, terminal devices can include vehicular communication devices that function as terminal devices.

The term "network access node" as utilized herein refers to a network-side device that provides a radio access network with which terminal devices can connect and exchange information with a core network and/or external data networks through the network access node. "Network access nodes" can include any type of base station or access point, including macro base stations, micro base stations, NodeBs, evolved NodeBs (eNBs), Home base stations, Remote Radio Heads (RRHs), relay points, Wi-Fi/WLAN Access Points (APs), Bluetooth master devices, D SRC RSUs, terminal devices acting as network access nodes, and any other electronic device capable of network-side wireless communications, including both immobile and mobile devices (e.g., vehicular network access nodes, mobile cells, and other movable network access nodes). As used herein, a "cell" in the context of telecommunications may be understood as a sector served by a network access node. Accordingly, a cell may be a set of geographically co-located antennas that correspond to a particular sectorization of a network access node. A network access node can thus serve one or more cells (or sectors), where the cells are characterized by distinct communication channels. Furthermore, the term "cell" may be utilized to refer to any of a macrocell, microcell, femtocell, picocell, etc. Certain communication devices can act as both terminal devices and network access nodes, such as a terminal device that provides network connectivity for other terminal devices.

Various aspects of this disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. For purposes of this disclosure, radio communication technologies may be classified as one of a Short Range radio communication technology or Cellular Wide Area radio communication technology. Short Range radio communication technologies may include Bluetooth, WLAN (e.g., according to any IEEE 802.11 standard), and other similar radio communication technologies. Cellular Wide Area radio communication technologies may include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA; including High Speed Downlink Packet Access (HSDPA), High Speed Uplink Packet Access (HSUPA), HSDPA Plus (HSDPA+), and HSUPA Plus (HSUPA+)), Worldwide Interoperability for Microwave Access (WiMax) (e.g., according to an IEEE 802.16 radio communication standard, e.g., WiMax fixed or WiMax mobile), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies.

The terms "radio communication network" and "wireless network" as utilized herein encompasses both an access section of a network (e.g., a radio access network (RAN) section) and a core section of a network (e.g., a core network section). The term "radio idle mode" or "radio idle state" used herein in reference to a terminal device refers to a radio control state in which the terminal device is not allocated at least one dedicated communication channel of a mobile communication network. The term "radio connected mode" or "radio connected state" used in reference to a terminal device refers to a radio control state in which the terminal device is allocated at least one dedicated uplink communication channel of a radio communication network.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e. unidirectional or bidirectional communication in one or both of the incoming and outgoing directions. The term "calculate" encompass both 'direct' calculations via a mathematical expression/formula/relationship and 'indirect' calculations via lookup or hash tables and other array indexing or searching operations.

Various radio communication systems use beamforming to improve system performance. In such beamforming systems, a device may be equipped with an antenna array and may be able to selectively apply beamforming weights to the antennas to adjust the radiation pattern of the antenna array. Such beamforming can be implemented at both transmitters and receivers to increase gain.

In scenarios where a receiver uses beamforming, the receiver may adaptively adjust its beamforming configuration based on the location of a counterpart transmitter. For example, the receiver may adjust the beamforming weights for its antenna array to steer the antenna array in the direction of the transmitter. This may become more complex when the transmitter and/or receiver move over time, as the receiver may track the direction of the transmitter over time and adaptively adjust the beamforming weights accordingly. In addition to tracking over time, the receiver may also perform an initial beam acquisition procedure to determine an initial direction of the transmitter. Among other use cases, techniques for beam acquisition and tracking are seen as important components in developing radio communication systems such as millimeter wave (mmWave), Wireless Gigabit Alliance (WiGiG) technologies, and autonomous driving systems.

Some beamforming algorithms are known as non-blind, where a transmitter may send pilot signals that a receiver can use to identify the beam direction (e.g., the Angle of Arrival (AoA)). For example, the transmitter can scan across the beam space (e.g., by switching between multiple beamforming weight vectors) while the receiver measures the pilot signals to identify the most appropriate beamforming configuration. The receiver can then provide feedback to the transmitter, which the transmitter can then use to select the best beamforming configuration as indicated in the feedback.

Other beamforming algorithms are known as blind, as they do not use pilot signals and feedback to adapt the beamforming configuration. In contrast to non-blind algorithms, which generally only perform tracking when the pilot signals are present, blind algorithms can function with data signals and can therefore track beams in a largely continuous manner. One example of a blind algorithm is the Constant Modulus Algorithm (CMA), which is a classical blind algorithm that primarily relies on signal profile to identify the beam direction.

Some of these algorithms, however, may have noticeable drawbacks. For example, non-blind algorithms incur cost in terms of bandwidth and time resources and may not track well in high-speed applications (e.g., due to feedback latency). This may be particularly problematic in, for example, autonomous driving applications which involve blockages and vehicles moving at high speeds. Blind algorithms such as CMA may not work well for signals with high Peak to Average Power Ratios (PAPR), such as OFDM signals.

Various aspects of this disclosure provide beamforming algorithms that use blind techniques. As described in full below, some aspects of a first beamforming technique may use equal gain beamforming to determine beamforming weights that align the phases of the signals received at each antenna. Some aspects of a second beamforming technique may determine beamforming weights by attempting to maximize the energy of the output signal.

FIG. 1 shows an exemplary configuration of a wireless communication device 100. Wireless communication device 100 may be any type of communication device configured for wireless communications, including any type of terminal device or network access node. As shown in FIG. 1, wireless communication device 100 may include antennas 102a-102n (collectively forming antenna array 102), RF chains 104a-104n (collectively forming RF transceiver 104), and digital baseband processor 106. Antennas 102a-102n may transmit and receive radio signals. In the receive direction, antennas 102a-102n may each wirelessly receive a respective wireless signal to produce respective analog signals. Antennas 102a-102n may then provide the respective analog signals to respective RF chains 104a-104n. RF chains 104a-104k may then downmix (e.g., from radio frequencies to baseband) and digitize the respective analog signals to obtain respective digital signals. These respective digital signal received at k-th antenna is denoted herein as $y_k(t)$, k=1, ..., K (with K giving the number of antennas and RF chains), where vector y(t) is the vector of digital signals $y_k(t)$. RF chains 104a-104k may then provide the digital signals $y_k(t)$ to digital beamformer 106. Digital beamformer 106 may then apply digital beamforming to the digital signals $y_k(t)$ to obtain an output signal r(t).

Assuming a flat fading scenario, the digital signal $y_k(t)$ received at the k-th antenna of antenna array 102 is given as $$y_k(t)=h_k x(t)+n(t) \qquad (1)$$

where $h_k$ is the channel coefficient between the k-th antenna and the transmitter, x(t) is the transmit signal transmitted by the transmitter, and n(t) is the noise signal.

Equation (1) can be rewritten in vector form for y(t) as $$y(t)=hx(t)+n(t) \qquad (2)$$

where channel vector h is defined as $$h = \sum_m g_m a(\phi_m) \qquad (3)$$

with $g_m$ as the complex channel gain for the m-th multipath and a(φ) is a vector $a(\phi)=[1\ e^{j\pi\ sin(\phi)}\ ...\ e^{j(K-1)\pi\ sin(\phi)}]^T$ that characterizes the differing angles of arrival for each of the K antennas in antenna array 102. This flat-fading model may use a cluster model where the angles are distributed around a center angle.

As shown in FIG. 1, digital beamformer 106 may receive digital signals $y_k(t)$, k=1, ..., K from RF chains 104a-104n. Digital beamformer 106 may then apply a beamforming weight vector w to $y_k(t)$ to produce output signal r(t) (e.g., a sample of r(t) corresponding to the samples of $y_k(t)$). For example, digital beamformer 106 may apply w to y(t) to obtain output vector z(t) with including weighted signals $z_k(t)$ given as $$z_k(t)=w_k^* y_k(t)=w_k^* h_k x(t)+w_k^* n(t) \qquad (4)$$

where each beamforming weight $w_k$ of w is a complex number. Each weighted signal $z_k(t)$ may therefore be the product of the complex conjugate of beamforming weight $w_k$ for the k-th antenna and the digital signal $y_k(t)$ from the k-th antenna.

From output vector z(t), digital beamformer 106 may obtain output signal r(t) as $$r(t) = \sum_k z_k(t) = \sum_k w_k^* y_k(t) \qquad (5)$$

e.g., by summing the weighted signals $z_k(t)$ from each of the K antennas 102a-102n.

In some aspects, digital beamformer 106 may use Equal Gain Combining (EGC), where the beamforming weights $w_k$, k=1, ..., K of w may have equal gain but differing phases. For example, each $w_k$ may be of the form $w_k=e^{j\Theta_k}$ (e.g., phase shifter only, where each $w_k$ has unity gain).

In optimal EGC conditions, the phase of the product of each beamforming weight $w_k$ and corresponding channel coefficient $h_k$ will be equal, or in other words, $$\angle w_1^* h_1 = ... = \angle w_K^* h_K \qquad (6)$$

For blind beamforming, the channel h is unknown (as there may not be any pilot signals from which h can be estimated). However, in high SNR cases, h can be approximated by y(t). Equation (6) therefore can be re-written with this approximation as $$\angle w_1^* y_1(t) = ... = \angle w_K^* y_K(t) \qquad (7)$$

or, equivalently, as $$z_1(t) = ... = z_K(t) \qquad (8)$$

Figure 2:
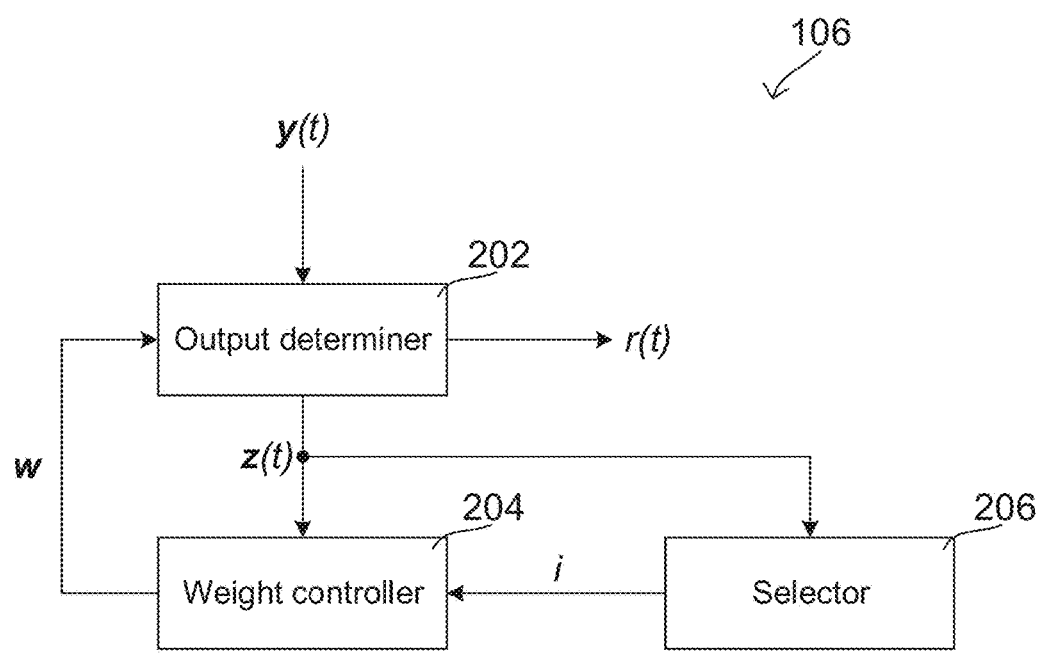
FIG. 2 shows an exemplary configuration of a digital beamformer according to some aspects.

In some aspects, digital beamformer 106 may implement a first beamforming technique based on Equations (6)-(8) to obtain r(t) from y(t). FIG. 2 shows an exemplary configuration of digital beamformer 106 according to some aspects related to the first beamforming technique. As shown in FIG. 2, digital beamformer 106 may include output determiner 202, weight controller 204, and selector 206. In some aspects, one or more of output determiner 202, weight controller 204, and selector 206 may be implemented as hardware components, where their operation as described below may be embodied as digital hardware logic. For example, output determiner 202, and weight controller 206 may be configured as hardware circuits, and may be mounted on an integrated circuit. In some aspects, one or more of output determiner 202, weight controller 204, and selector 206 may be implemented as processors, where their operation as described below may be embodied as executable instructions and executed by output determiner 202, weight controller 204, and selector 206.

Figure 3:
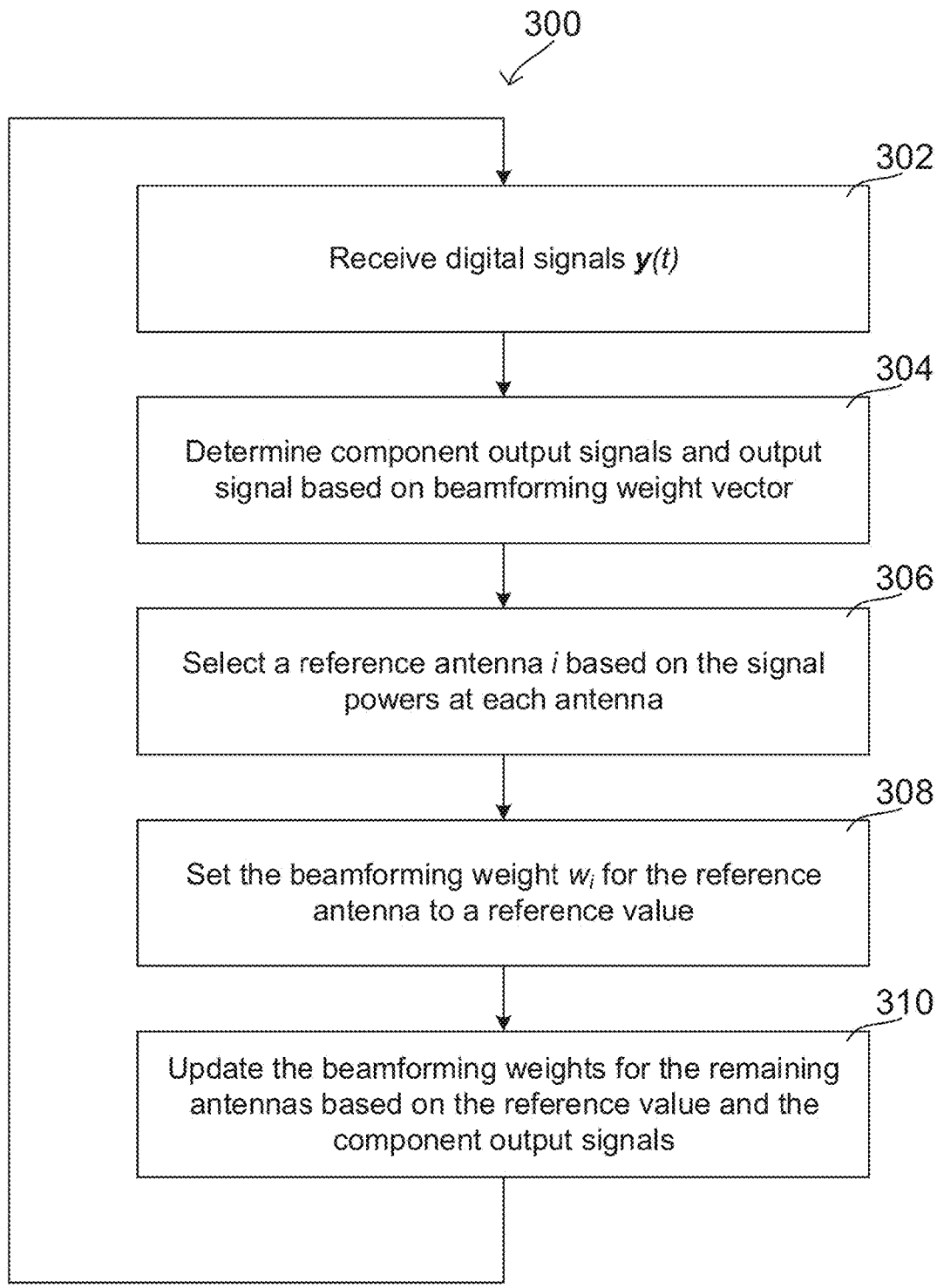
FIG. 3 shows an exemplary flow chart describing a first beamforming technique according to some aspects.

FIG. 3 shows exemplary flow chart 300, which describes the first beamforming technique according to some aspects. As shown in FIG. 3, digital beamformer 106 may first receive digital signals y(t) from RF chains 104a-104n in stage 302, which RF chains 104a-104n may have previously obtained from antenna array 102. Output determiner 202 may then determine weighted signals $z_k(t)$ and output signal r(t) based on beamforming weight vector w in stage 304. For example, output determiner 202 may apply the beamforming weight vector w to digital signals y(t) to obtain $z_k(t)$ as $z_k(t)=w_k^* y_k(t)$. Output determiner 202 may then sum the weighted signals $z_k(t)$ to obtain r(t) as $r(t)=\Sigma_k z_k(t)$. Output signal r(t) may be the beamformed output signal (for the current sample t), and digital beamformer 106 may forward r(t) for further baseband processing (e.g., for processing by other physical layer and/or protocol stack layer components of a baseband modem of wireless communication device 100).

Digital beamformer 106 may update beamforming weight vector w over time. As shown in FIG. 2, weight controller 204 may provide the current beamforming weight vector w (e.g., the beamforming weight vector for the current sample t) to output determiner 202. Output determiner 202 may therefore use this current beamforming weight vector w when executing stage 304. Weight controller 204 may then update w over time and continue to provide the current w to output determiner 202 for use in stage 304.

In some aspects, weight controller 204 may initialize w to initial weights (e.g., when digital beamformer 106 is first beginning to perform beamforming, such as after startup). In some aspects, weight controller 204 may initialize w to arbitrary values (e.g., set each $w_k$ to 1 or another arbitrary value). In some aspects, weight controller 204 may perform a training phase to determine the initial values of w. For example, weight controller 204 may test a plurality of candidate beamforming weight vectors (e.g., selected from a predefined beamforming codebook including a set of beamforming weight vectors) and identify a beamforming weight vector that produces a high power for r(t). In one example, weight controller 204 may apply each of the candidate beamforming weight vectors to the digital signals y(t) and obtain a candidate output signal r(t) for each candidate beamforming weight vector (e.g., using the calculations of Equations (4) and (5)). Weight controller 204 may then identify the candidate output signal with the highest power (e.g., highest value of $|r(t)|^2$), and select the corresponding candidate beamforming weight vector as the initial value for w. In some aspects, weight controller 204 may determine candidate output signals r(t) with the candidate beamforming vectors over a plurality of samples t (e.g., determining r(t) from y(t) over a plurality of samples t), average the candidate output signals (r) over t, identify the averaged candidate output signal with the highest power, and select the corresponding candidate beamforming vector as the initial value for w.

Weight controller 204 may update w over time. As shown in FIG. 2, output determiner 202 may provide weighted signals z(t) to weight controller 204 and to selector 206. Weight controller 204 and selector 206 may then use z(t) to update w. With reference to FIG. 3, selector 206 may select a reference antenna i based on the signal powers from each of antennas 102a-102n. For example, selector 206 may identify which weighted signal $z_k(t)$ has the highest expected signal power and then select i=k. This can be expressed as $$i = \underset{k}{\mathrm{argmax}} E\{|z_k(t)|^2\} \qquad (9)$$

where E(•) is the expected value and $|z_k(t)|^2$ gives the signal power of $z_k(t)$. In some aspects, selector 206 may calculate the expected value $E\{|z_k(t)|^2\}$ by averaging $z_k(t)$ over a plurality of samples t.

After selector 206 selects the reference antenna, selector 206 may specify the reference antenna to weight controller 204. Weight controller 204 may then update the beamforming weights $w_k$ for antennas 102a-102n based on the reference antenna (e.g., using the reference antenna as a reference point to determine the updates to the remaining antennas). For example, weight controller 204 may set the beamforming weight $w_i$ for the reference antenna to a reference value in stage 308, such as $w_i=1$ (e.g., where each $w_k=e^{j\theta_k}$ and $\theta i=0$). Weight controller 204 may then update the beamforming weights for the remaining antennas based on the reference value and the weighted signals.

As previously described for Equations (6)-(8), the optimal beamforming weight vector w may yield equal phases across $z_k(t)$ (using a high SNR approximation). Accordingly, weight controller 204 may use the reference antenna as a reference point and attempt to update the beamforming weights in a way that minimizes the angle difference between each $z_k(t)$ and $z_i(t)$. This minimization can be expressed as $$\min_{\theta_k}|\angle w_i^* y_i(t) - \angle w_k^* y_k(t)| = \min_{\theta_k}|\angle z_i(t) - \angle z_k(t)| \qquad (10)$$

For each beamforming weight $w_k$ of the remaining antennas, weight controller 204 may therefore attempt to identify a $\theta_k$ (with $w_k=e^{j\theta_k}$) that minimizes the difference in phase between $z_k(t)$ and $z_i(t)$. Accordingly, weight controller 204 may in stage 310 keep $w_i$ set to the reference value and, for each remaining antenna, update the phase term $\theta_k$ in its corresponding $w_k$. Using a closed loop solution to the minimization problem of Equation (10), weight controller 204 may update the phase terms $\theta_k$ in stage 310 as $$\theta_k = \theta_k - \mu \angle \{z_i(t)z_k^*(t)\} \qquad (11)$$

where the term $\mu \angle \{z_i(t)z_k^*(t)\}$ may be a phase update value and wherein the value of $\mu$ can be adjusted according to SNR (e.g., using a single value of $\mu$ and/or with a sequence of values for $\mu$ that address a wide range of SNR).

Weight controller 204 may therefore determine the product of the reference antenna weighted signal $z_i(t)$ and the complex conjugate of the remaining antenna weighted signal $z_k(t)$, determine the angle of the product, and scale the angle by a scale factor $\mu$. This result may be a phase update value, which weight controller 204 may then subtract from the current phase term $\theta_k$. This therefore gives the updated beamforming weight $w_k=e^{j\theta_k}$ for the remaining antenna k (which weight controller 204 may perform for each remaining antenna k). The scale factor $\mu$ can be set based on, for example, SNR, where higher values $\mu$ can be used for high SNR (e.g., up to 1) and lower values of $\mu$ can be used for low SNR (e.g., 0.1, 0.001, etc.).

In some aspects, weight controller 204 may alternatively use a small angle approximation and perform the updates to $w_k$ in stage 310 as $$\theta_k = \theta_k - \mu \mathrm{Im}\{z_i(t)z_k^*(t)\} \qquad (12)$$

where Im(•) denotes the imaginary part of (•). Weight controller 204 may therefore take the imaginary part of the product term $z_i(t)z_k^*(t)$ as opposed to calculating an angle, which in some cases can yield simpler hardware designs.

As can be seen in Equations (11) and (12), weight controller 204 may calculate the updated weights w based on the weighted signals $z_i(t)$ and $z_k(t)$ from the current sample, which output determiner 202 produced based on the current sample of y(t) and the current value of w. After updating w in stage 310, weight controller 204 may provide the updated w to output determiner 202. Output determiner 202 may then use the updated w to process the next sample of y(t) and produce the next sample of r(t). Weight controller 204 may then again update w based on the next samples weighted signals $z_k(t)$. Digital beamformer 106 may therefore repeat the process of message sequence chart 300 over time and continue to update w, where weight controller 204 updates w based on current samples of z(t) and output determiner 202 uses the updated w to determine the next sample of r(t).

In some aspects, selector 206 may re-select the reference antenna in stage 306 for each sample t. For example, selector 206 may select the reference antenna for each sample t based on an averaging window of past samples of each $z_k(t)$. In other aspects, selector 206 may periodically re-select the reference antenna, such as by reselecting the reference antenna every X samples or by reselecting the reference antenna based on a triggering condition (e.g., based on the observed radio environment). As weight controller 204 may use the reference antenna as a reference point with which to update the beamforming weights $w_k$ for the remaining antennas, weight controller 204 may keep the beamforming weight $w_i$ for the currently selected reference antenna set to the reference value (e.g., $w_i=1$).

Figure 4:
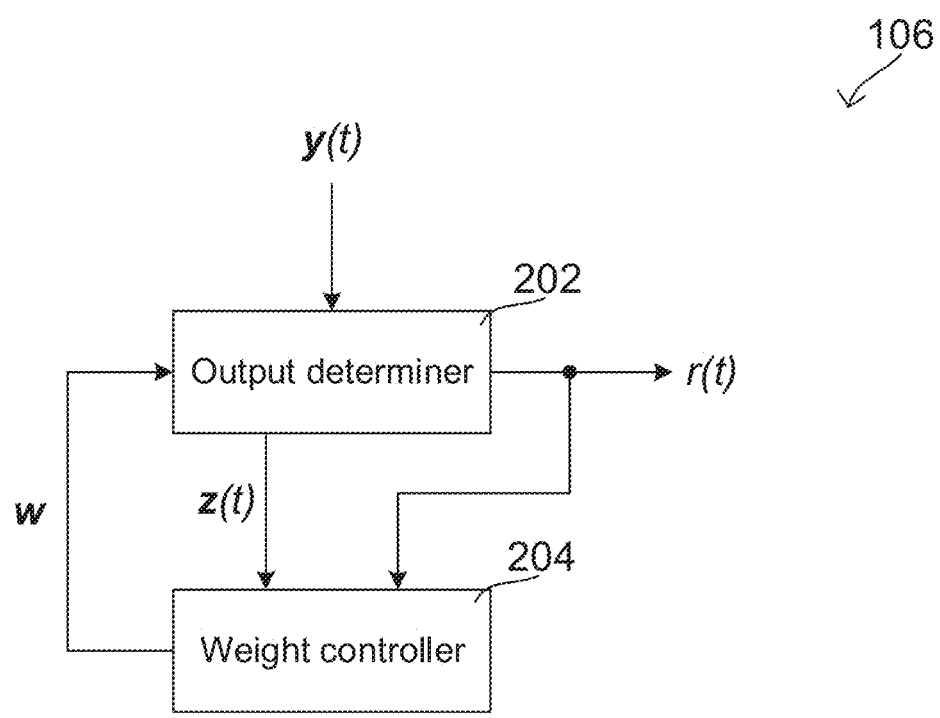
FIG. 4 shows an exemplary configuration of a digital beamformer according to some aspects.

The examples described above relate to various aspects of a first beamforming technique, where digital beamformer 106 may select a reference antenna and adapt beamforming weights to minimize a phase difference between the weighted signals of antennas with respect to the weighted signal of the reference antenna. FIG. 4 shows an exemplary configuration of digital beamformer 106 according to some aspects of a second beamforming technique. As shown in FIG. 4, digital beamformer 106 may include output determiner 202 and weight controller 204, which may be hardware or software components in the manner described above for FIG. 2.

Figure 5:
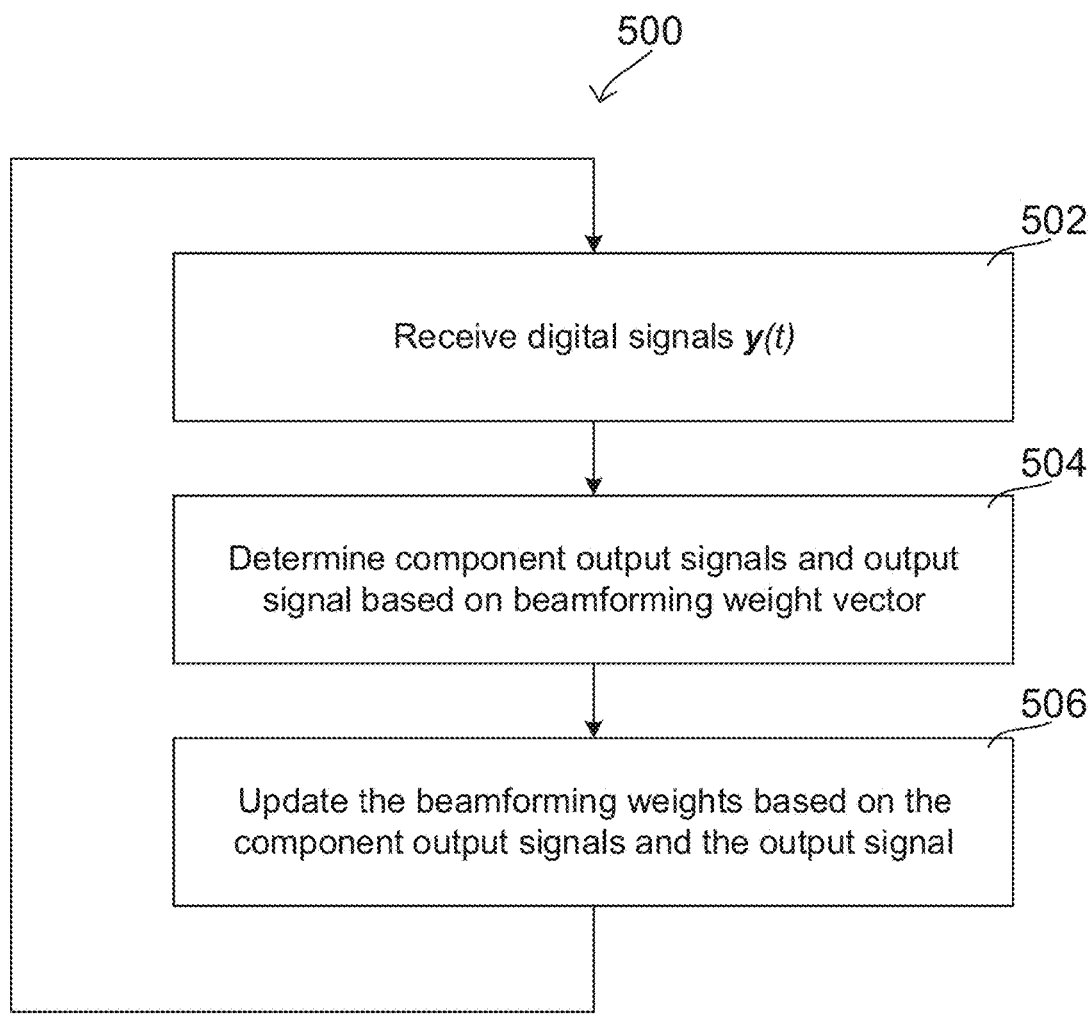
FIG. 5 shows an exemplary flow chart describing a second beamforming technique according to some aspects.

FIG. 5 shows exemplary flow chart 500, which describes the second beamforming technique according to some aspects. As shown in FIG. 5, digital beamformer 106 may first receive digital signals y(t) in stage 502 (e.g., from RF chains 104a-104n). Output determiner 202 may then determine weighted signals $z_k(t)$ and output signal r(t) based on beamforming weight vector w in stage 504, such as by using the calculations expressed above in Equations (4) and (5). Similar to the manner described above for FIG. 2, weight controller 204 may provide the current beamforming weight vector w to output determiner 202. In some aspects, weight controller 204 may initialize w to arbitrary values, while in other aspects weight controller 204 may initialize w based on identifying a candidate beamforming weight vector that yields a high signal power of r(t) during a training phase.

Output determiner 202 may then provide output signal r(t) as the beamformed output signal, which further downstream baseband component (e.g., physical and/or protocol stack layer components) of wireless communication device 100 may continue to process. As shown in FIG. 2, output determiner 202 may provide weighted signals $z_k(t)$ and output signal r(t) to weight controller 204.

Weight controller 204 may then update beamforming weight vector w based on the weighted signals $z_k(t)$ and output signal r(t) in stage 506. For example, weight controller 204 may attempt to update the beamforming weights w to solve the optimization problem expressed as $$\max_{\theta_k} E\{|r(t)|^2\} \quad (13)$$

or, in other words, may attempt to update each beamforming weight $w_k$ to have a phase term $\theta_k$ that maximizes the expected (or average) power of output signal r(t).

In one example, weight controller 204 may update the beamforming weights $w_k$ by updating the phase terms $\theta_k$ as $$\theta_k = \theta_k - \mu \angle \{z_k(t)r^*(t)\} \quad (14)$$

or, in other words, for a given antenna k may determine the product of the corresponding weighted signal $z_k(t)$ and the complex conjugate of the output signal r(t), determine the angle of this product, and scale the angle by a scale factor $\mu$ to obtain a phase update value. Weight controller 204 may then subtract this phase update value from the phase term $\theta_k$ of the beamforming weight $w_k$ to obtain an updated phase term $\theta_k$.

In some aspects, weight controller 204 may alternatively use a small angle approximation and determine the updated phase terms $\theta_k$ as $$\theta_k = \theta_k - \mu \text{Im}\{z_k(t)r^*(t)\} \quad (15)$$

namely by taking the imaginary part of the product $z_k(t)r^*(t)$ as opposed to performing an angle calculation.

Weight controller 204 may therefore obtain updated phase terms $\theta_k$ for the beamforming weights $w_k$, and may then update the beamforming weights $w_k$ as $w_k = e^{j\pi\theta_k}$ to obtain the updated beamforming weight vector w. As shown in FIG. 4, weight controller 204 may provide the updated beamforming weight vector w to output determiner 202, which may then use w as the current beamforming weight vector to determine r(t) for the next sample of y(t). Digital beamformer 106 may repeat this procedure of flow chart 500, such as by determining current samples of z(t) and r(t), updating w based on the current samples of z(t) and r(t), and then using the updated w to determine next samples of z(t) and r(t).

Various aspects of this disclosure may use the first or second beamforming techniques to produce output signal r(t) while updating beamforming weight vector w over time. This can enable wireless communication device 100 to perform beam acquisition and tracking, such as when wireless communication device 100 is receiving a signal from a transmitter in a scenario with dynamic movement. By comparison, the first beamforming technique may update beamforming weight vector w based on the pre-beamforming weighted signals $z_k(t)$ (e.g., before combining into output signal r(t)) while the second beamforming technique my update beamforming weight vector w based on the post-beamforming output signals r(t) (e.g., after combining $z_k(t)$ to obtain r(t)). In some cases, this can cause the second beamforming technique to be more sensitize to initialization of w, and in some cases it can therefore be advantageous for weight controller 204 to use a training phase to initialize w.

In some cases, the first and second beamforming techniques may allow for a more straightforward implementation compared to more complex beamforming systems. However, performance may still remain close to the ideal case of maximal ratio combining (MRC). Furthermore, the first and second beamforming techniques can also be used to perform tracking at each sample t. This can be useful both in cases with AoA changes within a symbol or every few symbols (which pilot-based techniques may not be able to track) as well as more extreme cases with AoA changes every sample. The first and second beamforming techniques may also be robust to interference and may yield tracking capabilities as a function of sampling frequency, meaning higher sampling frequency is enough for faster tracking regardless of signal bandwidth or signal properties.

Various aspects of the first and second beamforming techniques described above may use a fully-digital beamforming architecture, namely where the signal received at each antenna of the antenna array is digitized and available for processing at baseband. Some aspects of this disclosure provide a third beamforming technique, which may use a hybrid beamforming architecture. Compared to digital beamforming architectures that deploy a dedicated RF chain for each antenna, hybrid beamforming architectures may deploy a single RF chain for multiple antennas, and may therefore provide a single digitized output for multiple antennas. Furthermore, while fully-digital beamforming architectures apply beamforming weights digitally in the baseband domain, hybrid beamforming architectures may provide analog phase-shifters that apply beamforming weights in the analog domain.

Figure 6:
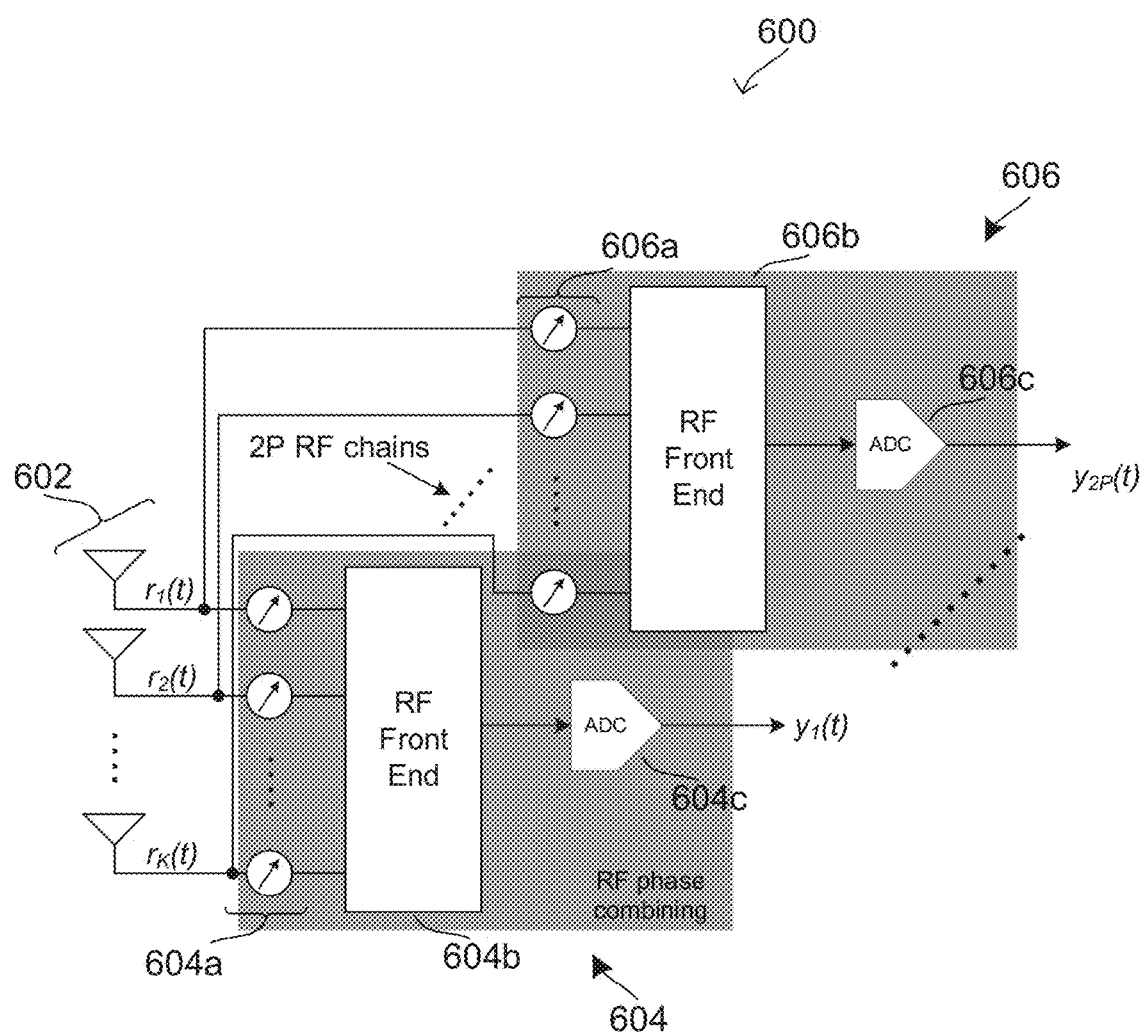
FIG. 6 shows an exemplary configuration of a wireless communication device according to some aspects.

FIG. 6 shows an exemplary configuration of wireless communication device 600 according to some aspects. As shown in FIG. 6, wireless communication device 600 may include antennas 602 (e.g., arranged into an antenna array), and RF chains 604-606. As indicated in FIG. 6, wireless communication device 600 may include 2P RF chains in total. In some aspects, each of RF chains 604-606 may include phase shifters, an RF front end, and an Analog-to-Digital Converter (ADC). For example, as shown in FIG. 6, RF chain 604 may include phase shifters 604a, RF front end 604b, and ADC 604c. The remaining RF chains, including RF chain 606, may likewise include respective phase shifters, RF front ends, and ADCs (e.g., RF phase shifters 606a, RF front end 606b, and ADC 606c in the case of RF chain 606).

With reference to the receive direction, antennas 602 (e.g., K antennas in total) may receive wireless RF signals to produce analog RF signals $r_k(t)$, k=1, ..., K, which are also referred to herein as received signals $r_k(t)$. Antennas 602 may then provide received signals $r_k(t)$ to RF chains 604-606. For example, as shown in FIG. 6 antennas 602 may provide $r_k(t)$ to phase shifters 604a of RF chain 604 and phase shifters 606a of RF front end 606. In some aspects, each of antennas 602 may provide their respective received signals $r_k(t)$ to each of the phase shifters of the RF chains, such as where phase shifters 604a of RF chain 604 includes K phase shifters that each receive a respective $r_k(t)$ from antennas 602. In some aspects, only a lesser subset of the phase shifters in an RF chain may receive an $r_k(t)$ from antennas 602.

While the following description focuses on RF chain 604, in some aspects multiple or all of RF chains 604-606 may be configured to operate in an analogous manner (e.g., in a same manner with different beamforming weights applied by their respective phase shifters). As shown in FIG. 6, phase shifters 604a (e.g., K in total) may receive the received signals $r_k(t)$ from antennas 602. In some aspects, phase shifters 604a may be configured as analog phase shifters. Phase shifters 604a may then apply beamforming weight vector $w_1^{t-1}$ to received signals $r_k(t)$, where the beamforming weight vectors $w_p^{t-1}$ specify the beamforming weight vector for the p-th RF chain (where RF chain 604 corresponds to, for example, the $(p=1)^{th}$ RF chain, and RF chain 606 corresponds to the $(p=2P)^{th}$ RF chain). Phase shifters 604a may then produce respective weighted signals (each based on an $r_k(t)$ and beamforming weight of $w_p^{t-1}$, the specifics of which are detailed below for the mathematical model), which they may then provide to RF front end 604b. RF front end 604b may then combine and downmix (e.g., from radio to baseband frequencies) the weighted signals and provide the resulting combined signal to ADC 604c. ADC 604c may then digitize the combined signal to obtain combined digital signal $y_1(t)$. As previously indicated, in some aspects each of RF chains 604-606 may perform this processing (with respective beamforming weight vectors $w_p^{t-1}$) to obtain a respective $y_p(t)$, p=1, ..., 2P.

A mathematical model of this processing by one RF chain, e.g., RF chain 604, will now be described. Assuming a flat-fading case, the received signal $r_k(t)$ at the k-th antenna can be expressed as $$r_k(t)=h_k x(t)+n_k(t) \quad (16)$$

where the channel coefficients $h_k$ are defined in the channel vector h as $$h = \sum_c \sum_m g_{cm} a(\phi_{cm}) \quad (17)$$

where $a(\phi)=[1 \ e^{j\pi \sin \phi} \ \ldots \ e^{j\pi(K-1)\phi}]^T$, $g_{cm}$ is the complex gain of the m-th component of the c-th cluster, and $\phi_{cm}$ are m=1, ..., M uniformly distributed angles in a small range around the cluster beam angle. This model is therefore a cluster-based model that assumes that the various multipaths will be arranged into C clusters.

As introduced above, RF chains 604-606 may include phase-shifters configured to apply phase shifts to the received signals $r_k(t)$. With exemplary reference to RF chain 604, phase shifters 604a may each apply a respective beamforming weight $w_{1,k}^{t-1}$ to received signals $r_k(t)$, where the notation t−1 specifies that the weight $w_{1,k}^{t-1}$ was determined with the prior sample. As phase shifters 604a apply the beamforming weights in the form of phase shifts, each beamforming weight $w_{i,k}^{t-1}$ can be expressed as a phase shift as $w_{i,k}^{t-1}=e^{j\Theta_{1,k}}$. As shown in FIG. 6, phase shifters 604a may provide the respective weighted signals $(w_{1,k}^{t-1})^* r_k(t)$ to RF front end 604b, which may combine and downmix the weighted signals and provide the combined signal to ADC 604c for digitization. ADC 604c may then produce combined digital signal $y_1(t)$.

Expanding this notation across each of the 2P RF chains, the combined digital signal $y_p(t)$ from the p-th RF chain can be expressed as $$y_p(t)=w_p^{t-1^H} r(t) \quad (18)$$

where $w_p^{t-1}$ are the beamforming weight vector of the p-th RF chain determined at time t 1 and $w_{p,k}^{t-1}=e^{j\Theta_{p,k}}$. The combined digital signal vector y(t) can also be defined to include each of $y_p(t)$, p=1, ..., 2P.

Wireless communication device 600 may therefore perform beamforming by adjusting beamforming weight vectors $w_p^{t-1}$. For example, wireless communication device 600 may be configured to perform beam tracking for up to P beams, where the number of RF chains, e.g., 2P RF chains, can be selected based on the number of beams that are targeted for tracking. Wireless communication device 600 may therefore assign two RF chains to track a single beam, where wireless communication device 600 may adjust the weights $w_p^{t-1}$ for the two RF chains based on the direction of the tracked beam.

Figure 7:
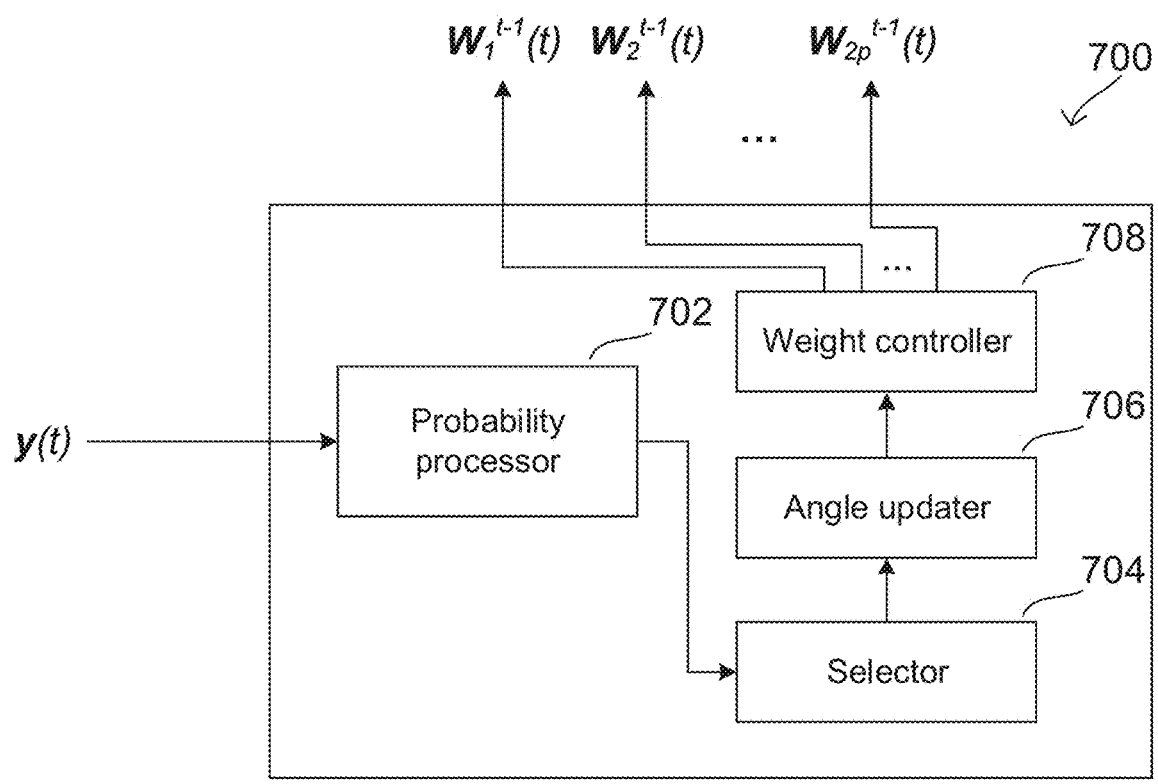
FIG. 7 shows an exemplary configuration of a beamforming controller according to some aspects.

FIG. 7 shows an exemplary configuration of beamforming controller 700 according to some aspects, which wireless communication device 600 may include as a component (e.g., in a baseband modem of wireless communication device 600). Beamforming controller 700 may be configured to adjust the beamforming weights $w_p^{t-1}$ for RF chains 604-606, such as to track the various beams targeted by wireless communication device 600. As shown in FIG. 7, beamforming controller 700 may receive combined digital signals y(t) and may output beamforming weight vectors $w_p^{t-1}$. Beamforming controller 700 may interface with the phase shifters (e.g., 604a and 606a) of RF chains 604-606 to specify the beamforming weight vectors $w_p^{t-1}$ The phase shifters may then adjust their respective phase-shift values $\theta_{p,k}$ (where $w_{p,k}^{t-1}=e^{j\theta_{p,k}}$) according to the weights of $w_p^{t-1}$. Beamforming controller 700 may therefore be configured to control the beamforming of wireless communication device 600 by adjusting $w_p^{t-1}$.

As shown in FIG. 7, beamforming controller 700 may include probability processor 702, selector 704, angle updater 706, and weight controller 708. In some aspects, one or more of probability processor 702, selector 704, angle updater 706, and weight controller 708 may be implemented as a hardware component, where their operation as described below may be embodied as digital hardware logic. For example, probability processor 702, selector 704, angle updater 706, and weight controller 708 may be configured as hardware circuits, and may be mounted on an integrated circuit. In some aspects, one or more of probability processor 702, selector 704, angle updater 706, and weight controller 708 may be implemented as a processor, where their operation as described below may be embodied as executable instructions and executed by probability processor 702, selector 704, angle updater 706, and weight controller 708.

Beamforming controller 700 may attempt to determine beamforming weight vectors $w_p^{t-1}$ that track the beams (e.g., up to P beams) targeted by wireless communication device 600. For example, beamforming controller 700 may attempt to determine beamforming weight vectors $w_p^{t-1}$ so that the output of RF chains 604-606 tracks the beams in the clusters, where the cluster outputs can be combined to obtain a maximum post-beamforming SNR. In some aspects, wireless communication device 600 may also include a digital beamformer, which may apply digital beamforming weights to one or more of the combined digital signals $y_p(t)$ to obtain an output signal r(t). For example, the digital beamformer may be configured in a similar manner to digital beamformer 106 of FIG. 4, and may include an output determiner and weight controller. In some aspects, the digital beamformer may determine the digital beamforming weights with the weight controller based on channel estimates obtained through processing of pilot signals from the targeted transmitters. The output determiner may then apply the digital beamforming weights to combined digital signals $y_p(t)$ to obtain the output signal r(t). In cases where there is only a single transmitter, the digital beamformer may obtain output signal r(t) by applying beamforming to all of combined digital signals $y_p(t)$. In other cases such as multi-user MIMO (MU-MIMO), the digital beamformer may assign certain of RF chains 604-606 to certain target transmitters, and may then apply beamforming to the combined digital signals $y_p(t)$ from these target transmitters to obtain the respective output signal r(t) for each respective transmitter.

The following description first presents a derivation of the weight update calculations by beamforming controller 700, followed by an explanation of the update procedure. Starting with the derivation, the angle of a given p-th beam can be expressed as $\phi_p$. Given this beam angle $\phi_p$, beamforming controller 700 may set the beamforming weight vectors $w_{2p-1}$ and $w_{2p}$ for the $(2p-1)^{th}$ and the $(2p)^{th}$ RF chains to $$w_{2p-1}=a(\phi_p), w_{2p}=a(\phi_p+\delta) \quad (19)$$

where $\delta$ is an angle offset, such as 3 degrees, 5 degrees, 10 degrees, and so forth.

Beamforming controller 700 may therefore attempt to track $\phi_p$ over time and to update the beamforming weight vectors $w_{2p-1}$ and $w_{2p}$ according to the estimated $\phi_p$ at each given point in time. For example, beamforming controller 700 may use combined digital signals $y_{2p-1}(t)$ and $y_{2p}(t)$ as observations and, based on the observations, estimate the beam angle $B_p$ and set $w_{2p-1}$ and $w_{2p}$ according to Equation (17). As the combined digital signals $y_{2p-1}(t)$ and $y_{2p}(t)$ are based on angles offset by $\delta$, the tracked beam may exhibit a change in signal power in two different directions. Accordingly, small angular changes in the tracked beam will cause interrelated variations in both $y_{2p-1}(t)$ and $y_{2p}(t)$. Beamforming controller 700 may therefore be able to more accurately track the beam given the availability of two RF chains for dedicated tracking.

Figure 8:
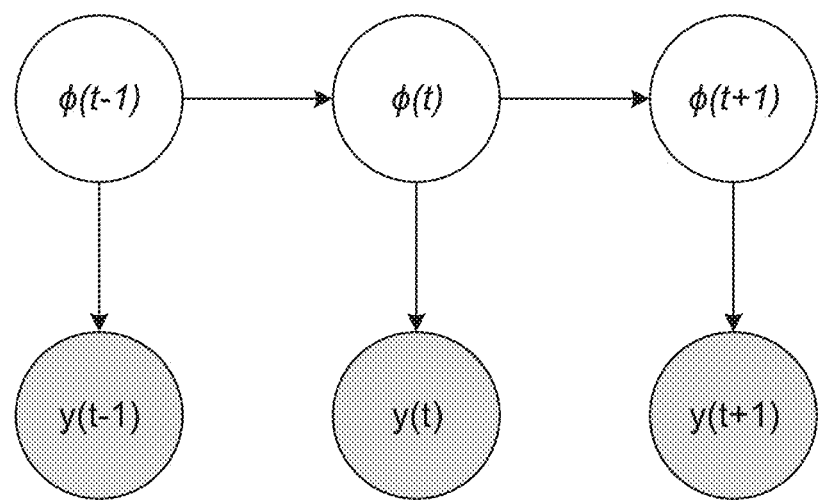
FIG. 8 shows an example of a Hidden Markov Model (HMM) with a beam angle as the state according to some aspects.

The beam angle $\phi_p$ can be treated as a hidden state in a Hidden Markov Model (HMM), where the observations $y_{2p-1}(t)$ and $y_{2p}(t)$ indicate the hidden state. FIG. 8 shows an exemplary illustration of a HMM for a single beam with beam angle $\phi$ according to some aspects. As shown in FIG. 8, the state $\phi$ may step from $\phi(t-1)$, $\phi(t)$, and $\phi(t+1)$, producing observations y(t-1), y(t), and y(t+1). The probability distribution of $\phi(t)$ given y(t) over all observations up to current sample t, expressed as $n(\phi_{0:t}|y_{0:t})$, can be approximated and can form the basis on which beamforming controller 700 tracks $\phi$. In cases where $p(\phi_{0:t}|y_{0:t})$ is Gaussian, a Kalman filter may produce suitable estimates of $\phi$. However, in some beamforming cases, there may be a non-linear relation between y and $\phi$ and $p(\phi_{0:t}|y_{0:t})$ consequently may not be Gaussian.

Beamforming controller 700 may therefore base its tracking on particle filters, which are Markov Chain Monte Carlo (MCMC) techniques that work with non-Gaussian distributions. For example, in some aspects beamforming controller 700 may use a discrete mass function, such as a probability mass function (PMF) to approximate the posterior distribution of the state $\phi$ given all observations of y (e.g., all observations of y from time 0 up to the current sample t). However, the use of a discrete function such as a PMF causes quantization noise depending, for example, on the number of discrete points and the range of the state. For example, the PMF $n(\phi_{0:t}|y_{0:t})$ may be defined by a plurality of discrete points that each correspond to a different value of $\phi$, where the value of $p(\phi_{0:t} \phi y_{0:t})$ for each discrete point gives the probability that, given the past observations $y_{0:t}$, the state $\phi$ is equal to that discrete point. However, if the discrete points are spaced too far apart across the given range of $\phi$, the number of points of $\phi$ will be limited, thus causing quantization error.

Figure 9:
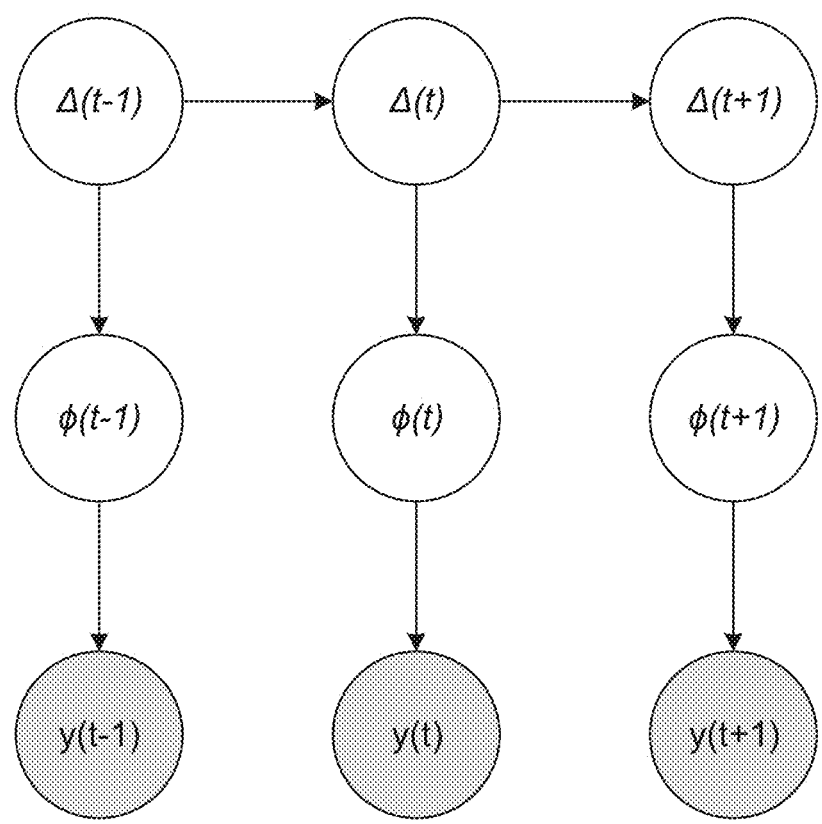
FIG. 9 shows an example of a Hidden Markov Model (HMM) with an angle variation as the state according to some aspects.

It may therefore be preferable to have a smaller range of the state in the PMF, as the same number of discrete points can be positioned closer to each other and can therefore track changes in the state more accurately. Accordingly, the state of the PMF can be redefined to be the variation, or change, in the beam angle $\phi$ rather than the beam angle $\phi$ itself. For example, by defining $\phi(t)$ as $\phi(t)=\phi(t-1)+\Delta(t)$, the variable $\Delta(t)$ becomes the angle variation in $\phi(t)$ over time. Beamforming controller 700 may therefore use angle variation $\Delta(t)$ as the state for tracking beam angle $\phi(t)$ over time. FIG. 9 shows an exemplary illustration of an HMM with state $\Delta(t)$ according to some aspects, where the evolution in $\Delta(t)$ over time is reflected by observations y(t).

Beamforming controller 700 may therefore track the beam angle $\phi$ by updating the PMF $p(y(t)|\phi(t))$ based on the samples of y(t) over time, where updating $p(y(t)|\phi(t))$ includes updating the probability weights at each discrete point of the PMF. These probability weight updates will first be derived for the fully digital case and subsequently extended into the hybrid case. Assuming a fully-digital architecture with a single path, y(t) is given as $$y(t)=a(\phi(t))x(t)+n(t) \quad (20)$$

where $a(\phi(t))$ gives K digital beamforming weights for beam angle $\phi(t)$ at a given sample t. As this example is fully digital, P can be taken as P=K, where each antenna is associated with one RF chain.

Particle filters such as those used by beamforming controller 700 may be based on underlying probability distributions. Continuing with the same single-path, fully-digital beamforming case, the posterior probability of $\Delta(t)$ given $\Delta(t-1)$ can be defined as a Normal distribution, namely $$p(\Delta(t)|\Delta(t-1))=N(0,\sigma_\Delta^2) \quad (21)$$

which may generally be a modeling assumption in the absence of additional statistical knowledge.

The PDF of state $\phi(t)$ given observations y(t) can therefore be expressed as $$p(y(t)|\phi(t))=CN(a(\phi)(t))x(t),\sigma^2)) \quad (22)$$

The PDF of Equation (22) can then be discretized into particles $\{\Delta_i, v_i\}$, where probability weight $v_i$ gives the posterior distribution of the state $\Delta_i$. Accordingly, the $\Delta_i$ with the highest probability weight $v_i$ at each time t therefore indicates the most probable angle variation. By updating the particles $\{\Delta_i, v_i\}$ at each time t based on observations y(t), beamforming controller 700 may track the variations in beam angle $\phi$ over time, thus also tracking $\phi$ over time.

Continuing with the single-path, fully-digital beamforming case, the probability weight update equations can be derived as $$v_i(t)=p(\Delta_i(t)|_{0:t}) \quad (23)$$

with $$v_i(t)\propto p(\Delta_i(t)|\Delta_i(t-1))p(\Delta_i(t-1)|y_{0:t-1}))P(y(t)|A_i(t)) \quad (24)$$

As it can be more straightforward to work in the log domain for exponential distributions, it can be assumed that with $w_i(t)$ is in the log domain. Equations (23) and (24) can then be rewritten as $$v_i(t)=v_i(t-1)-\|y(t)-a(\phi(t-1)+\Delta_i(t))x(t)\|/\sigma^{-2} \quad (25)$$

After expanding and omitting the terms that do not depend on i, Equation (25) becomes $$v_i(t)=v_i(t-1)+\mu|y(t)^H a(\phi(t-1)+\Delta_i(t))\|x(t)| \quad (26)$$

where $\mu$ is a scale factor, such as one based on SNR.

Beam angle $\phi(t-1)$ can then be replaced with beam angle estimate $\hat{\phi}(t-1)$, while x(t) can be dropped due to the blind nature of the beamforming. This yields $$v_i(t)=v_i(t-1)+\mu|+y(t)^H a(\hat{\phi}(t-1)+\Delta_i(t))| \quad (27)$$

Equations (22)-(27) can then be expanded to the hybrid beamforming case. Setting $W=[a(\phi)a(\phi+\delta)]^H$, Equation (22) becomes $$p(y(t)|\phi(t))=CN(Wa(\phi)(t))x(t),\sigma^2 WW^H) \quad (28)$$

Repeating the derivations described above for Equations (23)-(27) and again omitting x(t) gives $$v_i(t)=v_i(t-1)+\||y(t)^H R_W^{-1} Wa\phi(t-1)+\Delta_i(t))| \quad (29)$$

where $$R_W=WW^H \quad (30)$$

and where the term $\mu|y(t)^H R_W^{-1} Wa(\phi(t-1)+\Delta_i(t))|$ represents an update value for the probability weight $v_i(t-1)$.

Equations (29) and (30) therefore give the probability weight update calculations with which beamforming controller 700 may update the particles $\{\Delta_i, v_i\}$ to obtain a new probability weight $v_i$ for each discrete point $\Delta_i$. As previously indicated, the discrete point z with the highest $v_i$ indicates the most likely angle variation for $\phi(t)$. Accordingly, by identifying this $v_i$ and corresponding $\Delta_i$ after each probability weight update, beamforming controller 700 may be able to track beam angle $\phi(t)$ over its angle variations for each sample t and subsequently adjust the beamforming weight vector w. Beamforming controller 700 may perform this tracking for each of the P beams and set the phase-shifters of the $(2p-1)^{th}$ and $(2p)^{th}$ RF chains to $w_{2p-1}=a(\phi_p)$ and $w_{2p}=(\phi_p+\delta)$, as described above.

Figure 10:
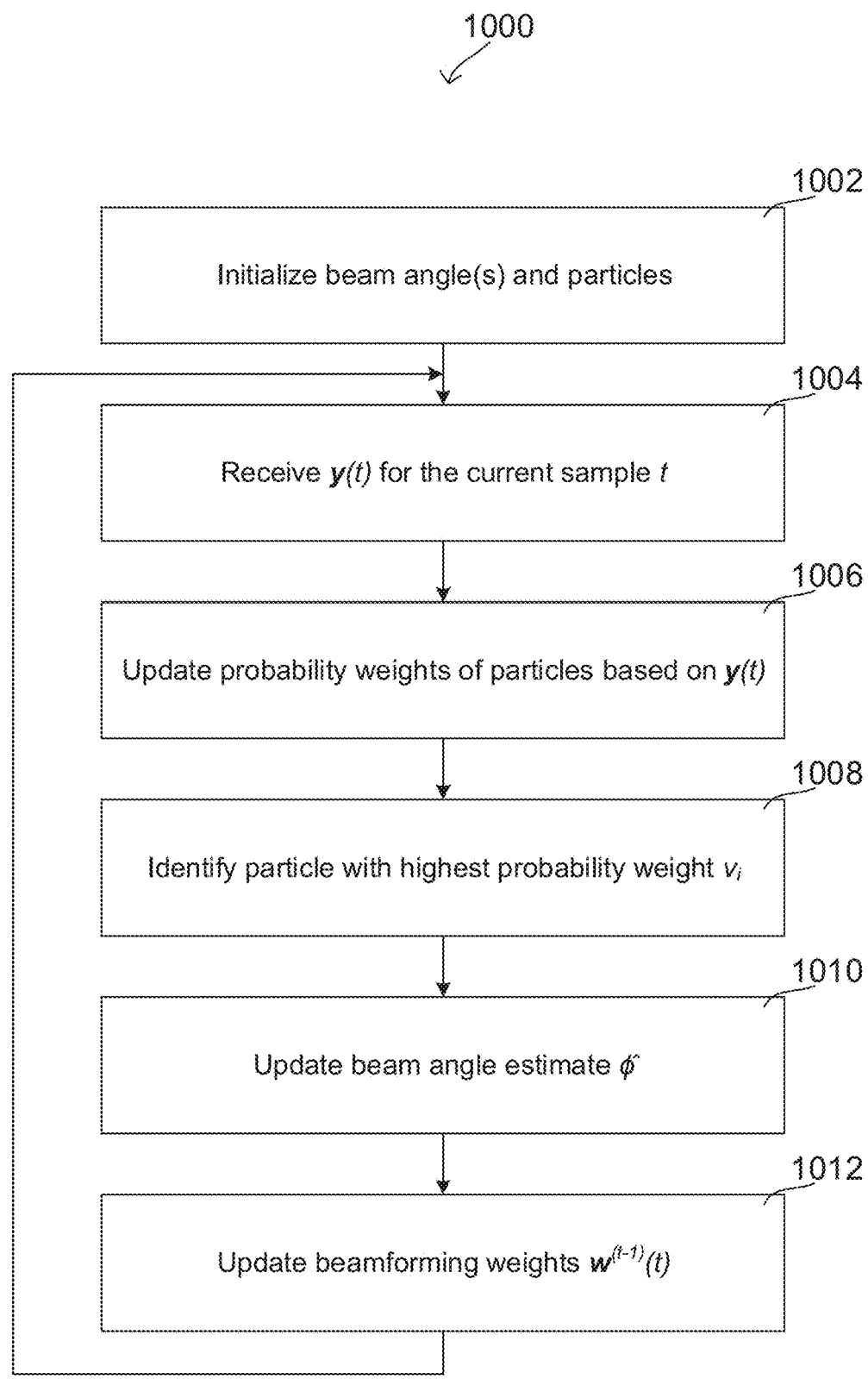
FIG. 10 shows a flow chart describing a third beamforming technique according to some aspects.

FIG. 10 shows exemplary flow chart 1000, which describes the third beamforming technique as executed by beamforming controller 700 according to some aspects. While the following description will focus on the processing involved in tracking one of the P beams, probability processor 702, selector 704, angle updater 706, and weight controller 708 may be configured to perform this processing for each of the P beams. For example, probability processor 702, selector 704, angle updater 706, and weight controller 708 may be configured to determine an estimated beam angle ($h_p$ for each of the P beams and to update the beamforming weights for the $(2p-1)^{th}$ and $(2p)^{th}$ RF chains to be $w_{2p-1}=a(\phi_p)$ and $w_{2p}=a(\phi_p+\delta)$.

As shown in FIG. 10, beamforming controller 700 may first in stage 1002 initialize the beam angles $\phi_p$ and, for each beam angle, initialize the corresponding particles $\{v_1, \Delta_i\}$ of the PMF. With reference to the configuration of beam controller 700 shown in FIG. 7, angle updater 706 may be responsible for tracking the beam angles $\phi_p$ over time, and may therefore be configured to initialize beam angles $\phi_p$ in stage 1002. For example, in some aspects beamforming controller 700 may perform an initial access procedure to determine the initial beam angles $\phi_p$, such as where wireless communication device 600 and the counterpart transmitter cooperate to identify initial beam angles $\phi_p$ and/or where beamforming controller 700 scans over multiple candidate beamforming weight vectors to identify a candidate beamforming weight vector and its beam angle that produce a high power for y(t).

Probability processor 702 may be configured to maintain the particles $\{v_1, \Delta_i\}$ for beamforming controller 700, and may therefore be configured to initialize the particles in stage 1002. For example, probability processor 702 may initialize the probability weights $v_i$ by sampling a normal distribution $N(0, \sigma_I^2)$. Each of the probability weights $v_i$ may correspond to its discrete point $\Delta_i$, where each particle therefore represents a different candidate angle variation (identified by $\Delta_i$) and the probability (given by $v_i$) that the candidate angle variation is Δ(t) for the current sample t. As there may be P beams for tracking, probability processor 702 may maintain a separate set of particles $\{v_1, \Delta_i\}$ for each beam (e.g., P separate sets of particles). In some aspects, probability processor 702 may include one or more processors or digital hardware circuits and a memory, where the processors or digital hardware circuits may be configured to perform the probability weight update calculations and the memory may be configured to store the data for the sets of particles $\{v_1, \Delta_i\}$.

Beamforming controller 700 may then receive y(t) for the current sample t in stage 1004. As previously described for FIG. 6, RF chains 604-606 may produce respective combined digital signals $y_p(t)$, p=1, . . . , 2P, namely by phase-shifting, combining, and digitizing the signals received at antennas 602. As shown in FIG. 7, beamforming controller 700 may receive these combined digital signals $y_p(t)$ at probability processor 702 in the form of y(t).

Probability processor 702 may then update the probability weights $v_i$ for the particles based on y(t) in stage 1006. For example, as previously described regarding Equations (28)-(30), probability processor 702 may update the probability weights as $v_i(t)=v_i(t-1)+\mu|y(t)^H R_W^{-1} Wa(\phi(t-1)+\Delta_i(t))|$. Accordingly, probability processor 702 may, for a given probability weight $v_i$, determine a weight update value $|y(t)^H R_W^{-1} Wa(\phi(t-1)+\Delta_i(t))|$ based on the combined digital signals y(t), the current beamforming weights a(φ) and a(φ)+δ, the beam angle φ(t−1) from the previous sample t−1, and the angle variation $\Delta_i(t)$ corresponding to the probability weight $v_i$ being updated. In some aspects, probability processor 702 may renormalize the probability weights $v_i$, which in some cases can improve stability. For example, probability processor 702 may by configured to determine the sum of all of probability weights $v_i$ and then divide each probability weight $v_i$ by this sum.

After updating the probability weights $v_i$ for the particles $\{v_i,\Delta_i\}$, probability processor 702 may provide the particles $\{v_1,\Delta_i\}$ (e.g., the data representing the current values of the particles) to selector 704. Selector 704 may then identify the particle with the highest probability weight $v_i$ in stage 1008. In various aspects, selector 704 may be a processor configured to execute a selection subroutine to identify a highest-valued number and/or may be a digital hardware circuit configured with selection logic to identify a highest-valued number. After identifying the particle with the highest probability weight $v_i$ and its corresponding angle variation $\Delta_i$, selector 704 may specify the angle variation $\Delta_i$ to angle updater 706.

Angle updater 706 may then update the estimated beam angle φ̂ (where the subscript p notation is dropped as this description focusses on the operation of beamforming controller 700 for each beam) in stage 1010. For example, angle updater 706 may be configured to store the estimated beam angle φ̂(t−1) from the previous sample t−1 (e.g., in a memory of angle updater 706). Upon receiving the angle variation $\Delta_i$ from selector 704, angle updater 706 may determine the estimated beam angle φ̂(t) for the current sample t as $$\hat{\phi}(t)=\hat{\phi}(t-1)+\Delta_i \quad (31)$$

In some aspects, angle updater 706 may include a memory for storing the estimated beam angle φ̂(t−1) and an adder for determining φ̂(t). After determining φ̂(t), angle updater 706 may provide φ̂(t) to weight controller 708.

Weight controller 708 may then update the beamforming weights w based on estimated beam angle φ̂(t). As previously indicated, each beam P may correspond to two RF chains of wireless communication device, namely the $(2p-1)^{th}$ and $(2P)^{th}$ RF chains. Accordingly, given the estimated beam angle φ̂$_p$(t), weight controller 708 may update the beamforming weight vectors $w_{2p-1}^{t-1}(t)$ and $w_{2p}^{t-1}(t)$ as $$w_{2p-1}^{t-1}(t)=a(\hat{\phi}_p(t)), w_{2p}^{t-1}(t)=a(\hat{\phi}_p(t)+\delta) \quad (32)$$

As previously detailed, beamforming controller 700 may perform this processing for each of the P beams being tracked, and may therefore produce beamforming weight vectors $w_{2p-1}^{t-1}(t)$ and $w_{2p}^{t-1}(t)$ for p=1, . . . , P at weight controller 708. Weight controller 708 may then provide the beamforming weight vectors $w_{2p-1}^{t-1}(t)$ and $w_{2p}^{t-1}(t)$ to phase shifters 604a-606a of RF chains 604-606. Phase shifters 604a-606a may then apply beamforming weight vectors $w_{2p-1}^{t-1}(t)$ and $w_{2p}^{t-1}(t)$ in the form of phase shifts on the next samples t of $r_k(t)$, k=1, . . . , K. The notation t−1 in $ww_{2p-1}^{t-1}(t)$ and $w_{2p}^{t-1}(t)$ therefore indicates that the beamforming weight vectors were calculated in the prior sample t−1 relative to the current sample t.

RF chains 604-606 may then produce the combined digital signals $y_p(t)$ for the new sample t, after which beamforming controller 700 may repeat the procedure of stages 1004-1012 to again update beamforming weight vectors $w_{2p-1}^{t-1}(t)$ and $w_{2p}^{t-1}(t)$. Accordingly, wireless communication device 600 may track the P beams over time as their respective angles φ$_p$ vary. In some aspects, this third beamforming technique may improve performance, and under some assumptions the particle filtering may match the maximum a posterior (MAP) estimation.

Figure 11:
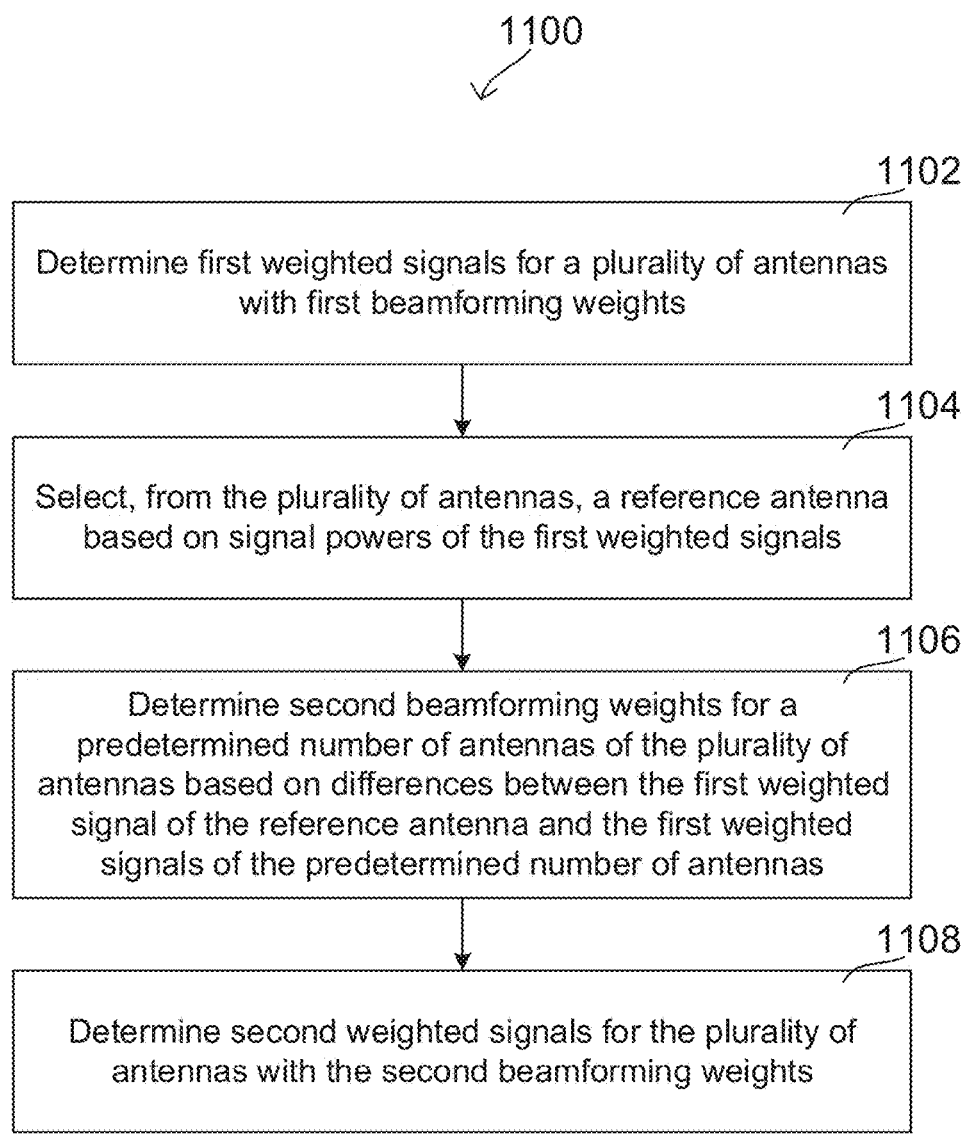
FIG. 11 shows a first exemplary method of performing beamforming according to some aspects.

FIG. 11 shows exemplary method 1100 of performing beamforming according to some aspects. As shown in FIG. 11, method 1100 includes determining first weighted signals for a plurality of antennas with first beamforming weights (1102), selecting, from the plurality of antennas, a reference antenna based on signal powers of the first weighted signals (1104), determining second beamforming weights for a predetermined number of antennas of the plurality of antennas based on differences between the first weighted signal of the reference antenna and the first weighted signals of the predetermined number of antennas (1106), and determining second weighted signals for the plurality of antennas with the second beamforming weights (1108).

Figure 12:
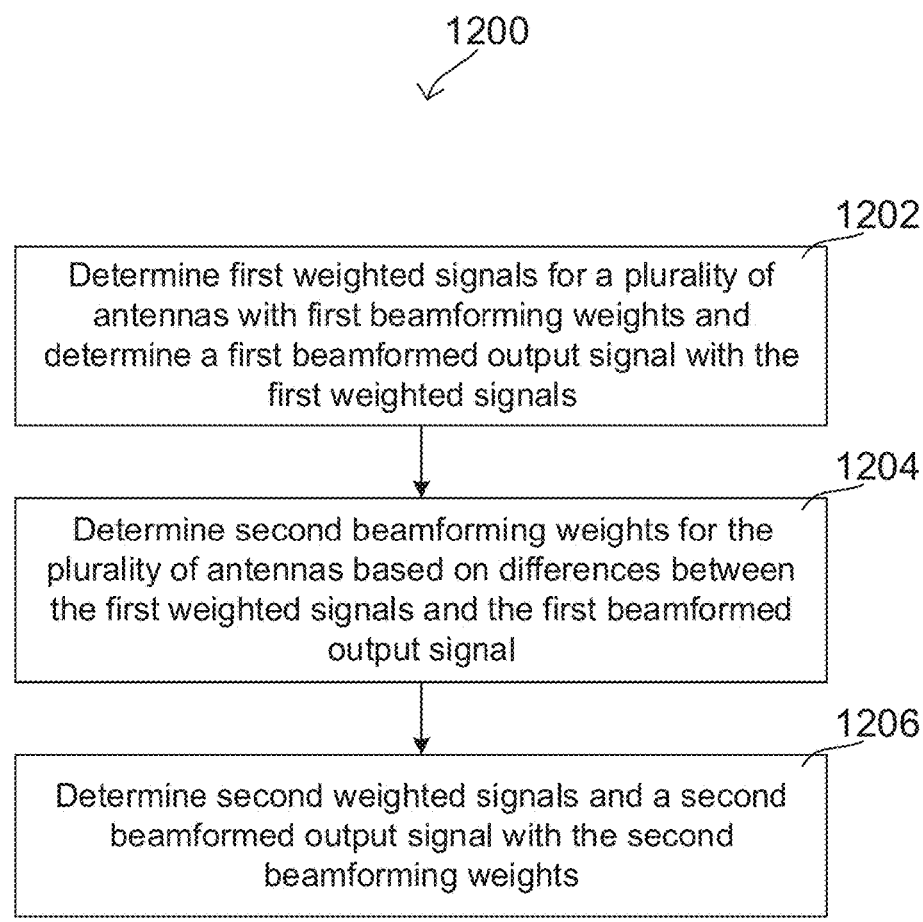
FIG. 12 shows a second exemplary method of performing beamforming according to some aspects.

FIG. 12 shows exemplary method 1200 of performing beamforming according to some aspects. As shown in FIG. 12, method 1200 includes determining first weighted signals for a plurality of antennas with first beamforming weights and determining a first beamformed output signal with the first weighted signals (1202), determining second beamforming weights for the plurality of antennas based on differences between the first weighted signals and the first beamformed output signal (1204), and determining second weighted signals and a second beamformed output signal with the second beamforming weights (1206).

Figure 13:
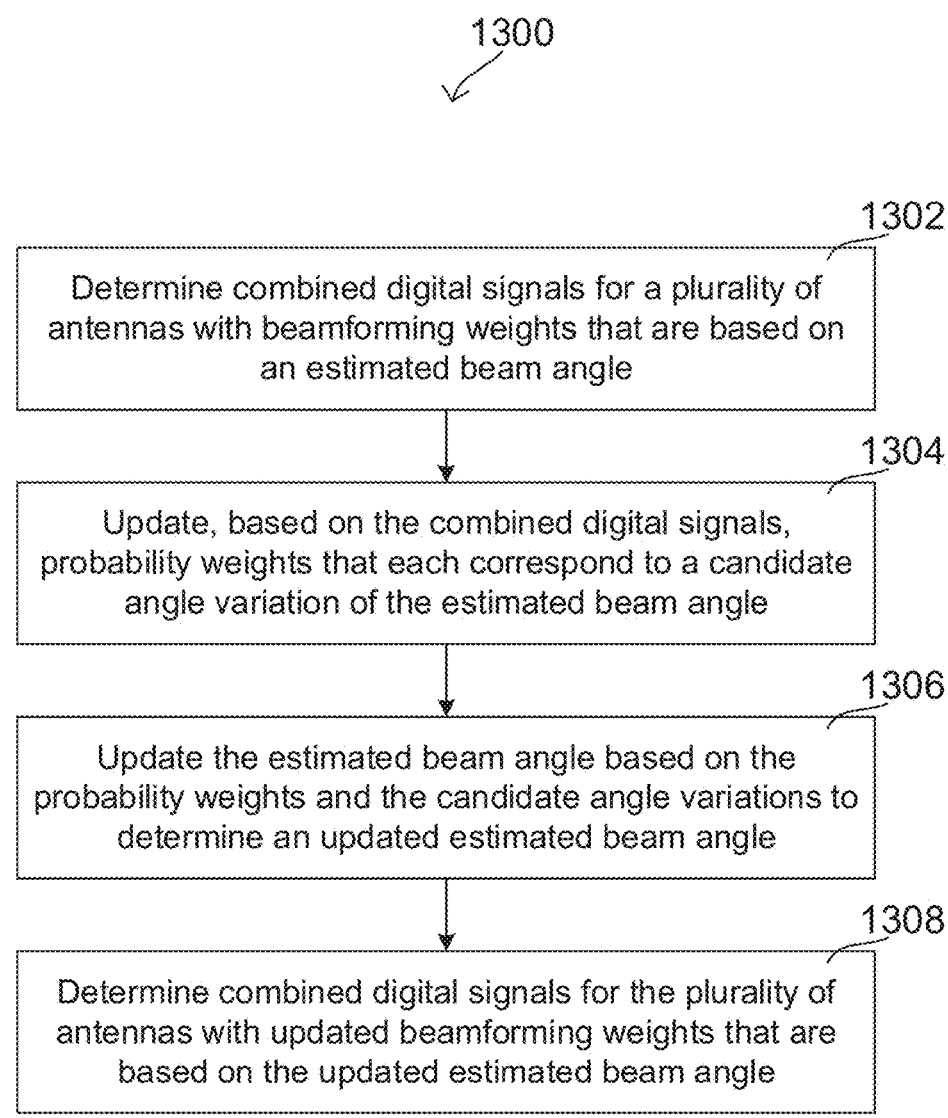
FIG. 13 shows a third exemplary method of performing beamforming according to some aspects.

FIG. 13 shows exemplary method 1300 of performing beamforming according to some aspects. As shown in FIG. 13, method 1300 includes determining combined digital signals for a plurality of antennas with beamforming weights that are based on an estimated beam angle (1302), updating, based on the combined digital signals, probability weights that each correspond to a candidate angle variation of the estimated beam angle (1304), updating the estimated beam angle based on the probability weights and the candidate angle variations to determine an updated estimated beam angle (1306), and determining combined digital signals for the plurality of antennas with updated beamforming weights that are based on the updated estimated beam angle (1308).

Figure 14:
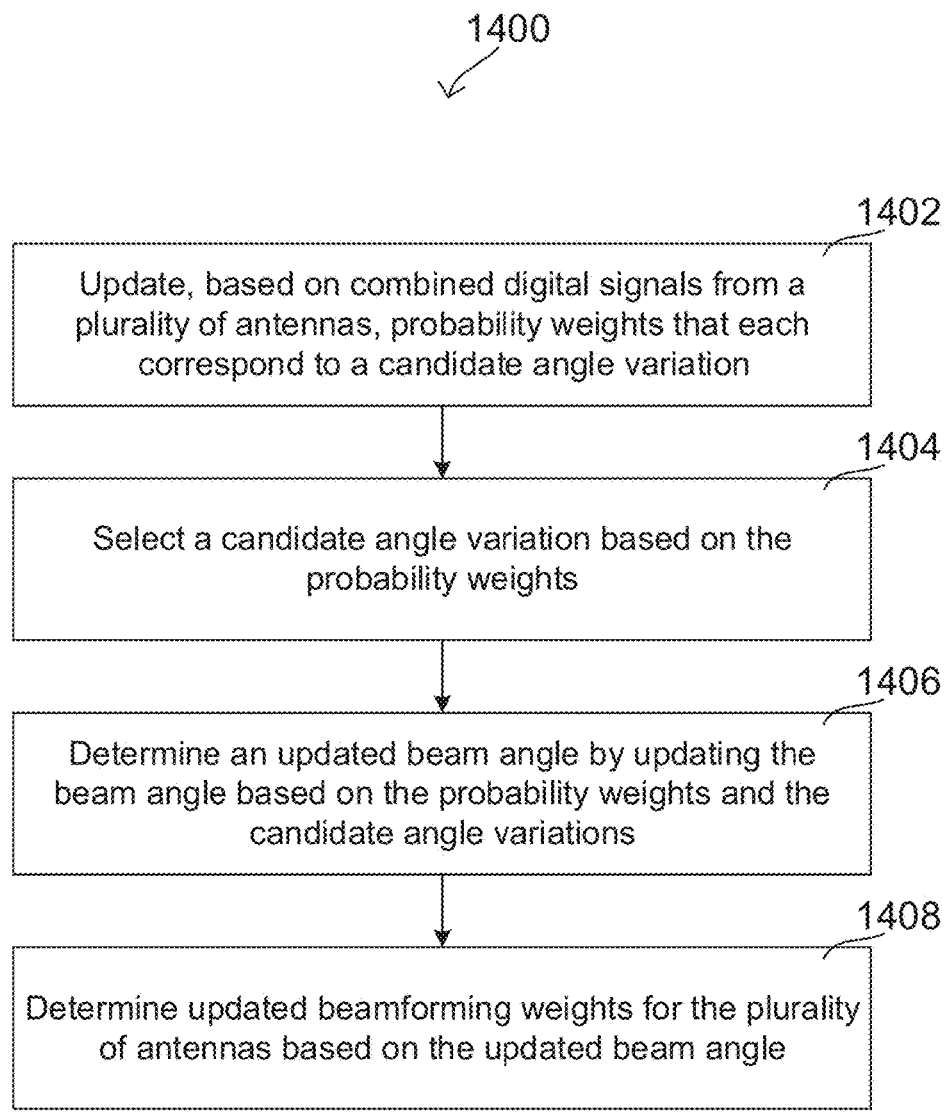
FIG. 14 shows a fourth exemplary method of performing beamforming according to some aspects.

FIG. 14 shows exemplary method 1400 of performing beamforming according to some aspects. As shown in FIG. 14, method 1400 includes updating, based on combined digital signals from a plurality of antennas, probability weights that each correspond to a candidate angle variation (1402), selecting a candidate angle variation based on the probability weights (1404), determining an updated beam angle by updating the beam angle based on the probability weights and the candidate angle variations (1406), and determining updated beamforming weights for the plurality of antennas based on the updated beam angle (1408).

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

Example 1 is a method of performing beamforming, the method including determining first weighted signals for a plurality of antennas with first beamforming weights, selecting, from the plurality of antennas, a reference antenna based on signal powers of the first weighted signals, determining second beamforming weights for a predetermined number of antennas of the plurality of antennas based on differences among the first weighted signal of the reference antenna and the first weighted signals of the predetermined number of antennas, and determining second weighted signals for the plurality of antennas with the second beamforming weights.

In Example 2, the subject matter of Example 1 can optionally include wherein determining the first weighted signals for the plurality of antennas with the first beamforming weights includes multiplying digital signals obtained from the plurality of antennas with respective first beamforming weights to obtain the first weighted signals.

In Example 3, the subject matter of Example 1 or 2 can optionally include wherein selecting, from the plurality of antennas, the reference antenna based on the signal powers of the first weighted signals includes determining signal powers of the first weighted signals, selecting, as the reference antenna, an antenna from the plurality of antennas that corresponds to the first weighted signal with a highest-valued signal power.

In Example 4, the subject matter of Example 3 can optionally include wherein determining the signal powers of the first weighted signals includes determining the signal powers as the average signal powers of the first weighted signals over a plurality of samples.

In Example 5, the subject matter of any one of Examples 1 to 4 can optionally include wherein determining the second beamforming weights based on the differences includes updating a phase of the first beamforming weights for the predetermined number of antennas based on phase differences between the first weighted signal of the reference antenna and the first weighted signals of the remaining antennas to obtain the second beamforming weights.

In Example 6, the subject matter of any one of Examples 1 to 4 can optionally include wherein determining the second beamforming weights based on the differences includes determining, as the second beamforming weights for the predetermined number of antennas, beamforming weights that minimize phase differences between the first weighted signal of the reference antenna and the first weighted signals of the predetermined number antennas.

In Example 7, the subject matter of any one of Examples 1 to 4 can optionally include wherein determining the second beamforming weights based on the differences includes determining a product of the first weighted signal of a first antenna of the predetermined number of antennas and a complex conjugate of the first weighted signal of the reference antenna, determining an angle or an imaginary part of the product, and updating, based on the angle or imaginary part, a phase of the first beamforming weight for the first antenna to obtain the second beamforming weight for the first antenna.

In Example 8, the subject matter of Example 7 can optionally further include scaling the angle or the imaginary part to obtain a phase update value, wherein updating, based on the angle or imaginary part, the phase of the first beamforming weight for the first antenna includes subtracting the phase update value from the phase of the first beamforming weight of the first antenna.

In Example 9, the subject matter of any one of Examples 1 to 8 can optionally further include setting the second beamforming weight for the reference antenna to a reference value, and wherein determining the second weighted signal for the reference antenna includes determining the second weighted signal for the reference antenna with the reference value.

In Example 10, the subject matter of any one of Examples 1 to 9 can optionally further include determining a beamformed output signal by combining the second weighted signals for the plurality of antennas.

Example 11 is a wireless communication device including an output determiner configured to determine first weighted signals for a plurality of antennas with first beamforming weights, a selector configured to select, from the plurality of antennas, a reference antenna based on signal powers of the first weighted signals, a weight controller configured to determine second beamforming weights for a predetermined number of antennas of the plurality of antennas based on a difference among the first weighted signal of the reference antenna and the first weighted signals of the predetermined number of antennas, the output determiner further configured to determine second weighted signals for the plurality of antennas with the second beamforming weights.

In Example 12, the subject matter of Example 11 can optionally further include the plurality of antennas and a plurality of radio frequency (RF) chains.

In Example 13, the subject matter of Example 12 can optionally include wherein the plurality of RF chains are configured to downmix and digitize received signals from the plurality of antennas to obtain a plurality of digital signals, and wherein the output determiner is configured to determine the first weighted signals by applying the first beamforming weights to the plurality of digital signals.

In Example 14, the subject matter of Example 11 can optionally include wherein the output determiner is configured to determine the first weighted signals for the plurality of antennas with the first beamforming weights by multiplying digital signals obtained from the plurality of antennas with respective first beamforming weights to obtain the first weighted signals.

In Example 15, the subject matter of any one of Examples 11 to 14 can optionally include wherein the selector is configured to select, from the plurality of antennas, the reference antenna based on the signal powers of the first weighted signals by determining signal powers of the first weighted signals, and selecting, as the reference antenna, an antenna from the plurality of antennas that corresponds to the first weighted signal with a highest-valued signal power.

In Example 16, the subject matter of Example 15 can optionally include wherein the selector is configured to determine the signal powers of the first weighted signals by determining the signal powers as the average signal powers of the first weighted signals over a plurality of samples.

In Example 17, the subject matter of any one of Examples 11 to 16 can optionally include wherein the weight controller is configured to determine the second beamforming weights based on the differences by updating a phase of the first beamforming weights for the predetermined number of antennas based on phase differences between the first weighted signal of the reference antenna and the first weighted signals of the remaining antennas to obtain the second beamforming weights.

In Example 18, the subject matter of any one of Examples 11 to 16 can optionally include wherein the weight controller is configured to determine the second beamforming weights based on the differences by determining, as the second beamforming weights for the predetermined number of antennas, second beamforming weights that minimize phase differences between the first weighted signal of the reference antenna and the first weighted signals of the predetermined number of antennas.

In Example 19, the subject matter of any one of Examples 11 to 16 can optionally include wherein the weight controller is configured to determine the second beamforming weights based on the differences by determining a product of the first weighted signal of a first antenna of the predetermined number antennas and a complex conjugate of the first weighted signal of the reference antenna, determining an angle or an imaginary part of the product, and updating, based on the angle or imaginary part, a phase of the first beamforming weight for the first antenna to obtain the second beamforming weight for the first antenna.

In Example 20, the subject matter of Example 19 can optionally include wherein the weight controller is further configured to scale the angle or the imaginary part to obtain a phase update value, wherein the weight controller is configured to update the phase of the first beamforming weight for the first antenna to obtain the second beamforming weight for the first antenna by subtracting the phase update value from the phase of the first beamforming weight of the first antenna.

In Example 21, the subject matter of any one of Examples 11 to 20 can optionally include wherein the weight controller is further configured to set the second beamforming weight for the reference antenna to a reference value, and wherein the output determiner is configured to determine the second weighted signal for the reference antenna by determining the second weighted signal for the reference antenna with the reference value.

In Example 22, the subject matter of any one of Examples 11 to 21 can optionally include wherein the output determiner is further configured to determine a beamformed output signal by combining the second weighted signals for the plurality of antennas.

Example 23 is a method of performing beamforming, the method including determining first weighted signals for a plurality of antennas with first beamforming weights and determining a first beamformed output signal with the first weighted signals, determining second beamforming weights for the plurality of antennas based on differences between the first weighted signals and the first beamformed output signal, and determining second weighted signals and a second beamformed output signal with the second beamforming weights.

In Example 24, the subject matter of Example 23 can optionally include wherein determining the first weighted signals for the plurality of antennas with the first beamforming weights includes multiplying digital signals obtained from the plurality of antennas with first respective beamforming weights to obtain the first weighted signals.

In Example 25, the subject matter of Example 23 or 24 can optionally include wherein determining the first beamformed output signal with the first weighted signals includes summing the first weighted signals for the plurality of antennas to obtain the first beamformed output signal.

In Example 26, the subject matter of any one of Examples 23 to 25 can optionally include wherein determining the second beamforming weights based on the differences includes updating a phase of the first beamforming weights for the plurality of antennas based on phase differences between the first weighted signals and the first beamformed output signal.

In Example 27, the subject matter of any one of Examples 23 to 25 can optionally include wherein determining the second beamforming weights based on the differences includes determining, as the second beamforming weights, beamforming weights that minimize phase differences between the first weighted signals and the first beamformed output signal.

In Example 28, the subject matter of any one of Examples 23 to 25 can optionally include wherein determining the second beamforming weights based on the differences includes determining a product of the first weighed signal of a first antenna of the plurality of antennas and a complex conjugate of the first beamformed output signal, determining an angle or an imaginary part of the product, and updating, based on the angle or imaginary part, a phase of the first beamforming weight for the first antenna to obtain the second beamforming weight for the first antenna.

In Example 29, the subject matter of Example 28 can optionally further include scaling the angle or the imaginary part to obtain a phase update value, wherein updating the phase of the first beamforming weight for the first antenna includes adding the phase update value to the phase of the first beamforming weight of the first antenna.

In Example 30, the subject matter of any one of Examples 23 to 29 can optionally include wherein determining the second weighted signals and the second beamformed output signal with the second beamforming weights includes multiplying digital signals obtained from the plurality of antennas with respective second beamforming weights to obtain the second weighted signals, and summing the second weighted signals to obtain the second beamformed output signal.

Example 31 is a wireless communication device including an output determiner configured to determine first weighted signals for a plurality of antennas with first beamforming weights and to determine a first beamformed output signal with the first weighted signals, and a weight controller configured to determine second beamforming weights for the plurality of antennas based on differences between the first weighted signals and the first beamformed output signal, the output determiner further configured to determine second weighted signals and a second beamformed output signal with the second beamforming weights.

In Example 32, the subject matter of Example 31 can optionally further include the plurality of antennas and a plurality of radio frequency (RF) chains.

In Example 33, the subject matter of Example 32 can optionally include wherein the plurality of RF chains are configured to downmix and digitize received signals from the plurality of antennas to obtain a plurality of digital signals, and wherein the output determiner is configured to determine the first weighted signals by applying the first beamforming weights to the plurality of digital signals.

In Example 34, the subject matter of Example 31 can optionally include wherein the output determiner is configured to determine the first weighted signals for the plurality of antennas with the first beamforming weights by multiplying digital signals obtained from the plurality of antennas with respective first beamforming weights to obtain the first weighted signals.

In Example 35, the subject matter of any one of Examples 31 to 34 can optionally include wherein the output determiner is configured to determine the first beamformed output signal with the first weighted signals by summing the first weighted signals for the plurality of antennas to obtain the first beamformed output signal.

In Example 36, the subject matter of any one of Examples 31 to 35 can optionally include wherein the output determiner is configured to determine the second beamforming weights based on the differences by updating a phase of the first beamforming weights for the plurality of antennas based on phase differences between the first weighted signals and the first beamformed output signal.

In Example 37, the subject matter of any one of Examples 31 to 35 can optionally include wherein the output determiner is configured to determine the second beamforming weights based on the differences by determining, as the second beamforming weights, beamforming weights that minimize phase differences between the first weighted signals and the first beamformed output signal.

In Example 38, the subject matter of any one of Examples 31 to 35 can optionally include wherein the output determiner is configured to determine the second beamforming weights based on the differences by determining a product of the first weighed signal of a first antenna of the plurality of antennas and a complex conjugate of the first beamformed output signal, determining an angle or an imaginary part of the product, and updating, based on the angle or imaginary part, a phase of the first beamforming weight for the first antenna to obtain the second beamforming weight for the first antenna.

In Example 39, the subject matter of Example 38 can optionally include wherein the output determiner is further configured to scale the angle or the imaginary part to obtain a phase update value, and wherein the weight controller is configured to update the phase of the first beamforming weight for the first antenna by adding the phase update value to the phase of the first beamforming weight of the first antenna.

In Example 40, the subject matter of any one of Examples 31 to 39 can optionally include wherein the output determiner is configured to determine the second weighted signals and the second beamformed output signal with the second beamforming weights by multiplying digital signals obtained from the plurality of antennas with respective second beamforming weights to obtain the second weighted signals, and summing the second weighted signals to obtain the second beamformed output signal.

Example 41 is a method of performing beamforming, the method including determining combined digital signals for a plurality of antennas with beamforming weights that are based on an estimated beam angle, updating, based on the combined digital signals, probability weights that each correspond to a candidate angle variation of the estimated beam angle, updating the estimated beam angle based on the probability weights and the candidate angle variations to determine an updated estimated beam angle, and determining combined digital signals for the plurality of antennas with updated beamforming weights that are based on the updated estimated beam angle.

In Example 42, the subject matter of Example 41 can optionally include wherein determining the combined digital signals for the plurality of antennas with the beamforming weights includes determining a first combined digital signal from the plurality of antennas with first beamforming weights directed towards the estimated beam angle, and determining a second combined digital signal from the plurality of antennas with second beamforming weights directed towards an offset estimated beam angle that is offset from the estimated beam angle by an angle offset.

In Example 43, the subject matter of Example 42 can optionally include wherein determining the first combined digital signal from the plurality of antennas with the first beamforming weights includes applying the first beamforming weights to received signals from the plurality of antennas with phase shifters.

In Example 44, the subject matter of any one of Examples 41 to 43 can optionally include wherein updating the estimated beam angle based on the probability weights and the candidate angle variations to determine the updated estimated beam angle includes updating the estimated beam angle based on a candidate angle variation that has a highest probability weight of the probability weights.

In Example 45, the subject matter of any one of Examples 41 to 43 can optionally include wherein updating the estimated beam angle based on the probability weights and the candidate angle variations to determine the estimated updated beam angle includes selecting a candidate angle variation from the candidate angle variations that has a highest-valued probability weight, and updating the estimated beam angle with the candidate angle variation to determine the updated estimated beam angle.

In Example 46, the subject matter of Example 45 can optionally include wherein updating the estimated beam angle with the candidate angle variation to determine the updated estimated beam angle includes adding the candidate angle variation to the estimated beam angle.

In Example 47, the subject matter of any one of Examples 41 to 46 can optionally include wherein the estimated beam angle estimates a beam received by the plurality of antennas, and wherein updating the probability weights includes updating the probability weights are based on posterior probability mass function of angle variations in the beam over time.

In Example 48, the subject matter of any one of Examples 41 to 47 can optionally include wherein the updating the probability weights includes updating the probability weights based on a probability mass function that indicates a probability of the candidate angle variations given the combined digital signals.

In Example 49, the subject matter of any one of Examples 41 to 48 can optionally include wherein updating the probability weights includes determining, for a first probability weight, an update value based on the combined digital signals, the beamforming weights, the corresponding candidate angle variation, and the estimated beam angle, and updating the first probability weight with the update value.

In Example 50, the subject matter of any one of Examples 41 to 49 can optionally include wherein determining the next combined digital signals for the plurality of antennas with the updated beamforming weights includes determining a first combined digital signal from the plurality of antennas with first updated beamforming weights directed towards the updated estimated beam angle, and determining a second combined digital signal from the plurality of antennas with second updated beamforming weights directed towards an offset updated estimated beam angle that is offset from the updated estimated beam angle by an angle offset.

Example 51 is a wireless communication device including a plurality of radio frequency (RF) chains configured to determine combined digital signals for a plurality of antennas with beamforming weights that are based on an estimated beam angle, and a beamforming controller configured to update, based on the combined digital signals, probability weights that each correspond to a candidate angle variation of the estimated beam angle, and further configured to update the estimated beam angle based on the probability weights and the candidate angle variations to determine an updated estimated beam angle, the plurality of RF chains further configured to determine next combined digital signals for the plurality of antennas with updated beamforming weights that are based on the updated estimated beam angle.

In Example 52, the subject matter of Example 51 can optionally include wherein the plurality of RF chains include a first RF chain configured to determine a first combined digital signal from the plurality of antennas with first beamforming weights directed towards the estimated beam angle, and a second RF chain configured to determine a second combined digital signal from the plurality of antennas with second beamforming weights directed towards an offset estimated beam angle that is offset from the estimated beam angle by an angle offset.

In Example 53, the subject matter of Example 52 can optionally include wherein the first RF chain includes a plurality of phase shifters configured to apply the first beamforming weights to received signals from the plurality of antennas to obtain a plurality of weighted signals.

In Example 54, the subject matter of Example 53 can optionally include wherein the first RF chain further includes an adder configured to add the plurality of weighted signals to obtain a combined signal and an analog-to-digital converter (ADC) configured to digitize the combined signal to obtain the first combined digital signal.

In Example 55, the subject matter of any one of Examples 51 to 54 can optionally include wherein the beamforming controller is configured to update the estimated beam angle to determine the updated estimated beam angle by updating the estimated beam angle based on a candidate angle variation that has a highest probability weight of the probability weights.

In Example 56, the subject matter of any one of Examples 51 to 54 can optionally include wherein the beamforming controller is configured to update the estimated beam angle based on the probability weights to determine the estimated updated beam angle by selecting a candidate angle variation from the candidate angle variations that has a highest-valued probability weight, and updating the estimated beam angle with the candidate angle variation to determine the updated estimated beam angle.

In Example 57, the subject matter of Example 56 can optionally include wherein the beamforming controller is configured to update the estimated beam angle with the candidate angle variation to determine the updated estimated beam angle by adding the candidate angle variation to the estimated beam angle.

In Example 58, the subject matter of any one of Examples 51 to 57 can optionally include wherein the estimated beam angle estimates a beam received by the plurality of antennas, and wherein the beamforming controller is configured to update the probability weights are based on posterior probability mass function of angle variations in the beam over time.

In Example 59, the subject matter of any one of Examples 51 to 58 can optionally include wherein the beamforming controller is configured to update the probability weights based on a probability mass function that indicates a probability of the candidate angle variations given the combined digital signals.

In Example 60, the subject matter of any one of Examples 51 to 59 can optionally include wherein the beamforming controller is configured to update the probability weights by determining, for a first probability weight, an update value based on the combined digital signals, the beamforming weights, the corresponding candidate angle variation, and the estimated beam angle, and updating the first probability weight with the update value.

In Example 61, the subject matter of any one of Examples 51 to 59 can optionally include wherein the plurality of RF chains are configured to determine the next combined digital signals for the plurality of antennas with the updated beamforming weights by determining a first combined digital signal from the plurality of antennas with first updated beamforming weights directed towards the updated estimated beam angle, and determining a second combined digital signal from the plurality of antennas with second updated beamforming weights directed towards an offset updated estimated beam angle that is offset from the updated estimated beam angle by an angle offset.

Example 62 is a beamforming controller configured to a probability processor configured to update, based on combined digital signals from a plurality of antennas, probability weights that each correspond to a candidate angle variation, a selector configured to select a candidate angle variation based on the probability weights, an angle updater configured determine an updated beam angle by updating the beam angle based on the probability weights and the candidate angle variations, and a weight controller configured to determine updated beamforming weights for the plurality of antennas based on the updated beam angle.

Example 63 is a method of performing beamforming, the method including updating, based on combined digital signals from a plurality of antennas, probability weights that each correspond to a candidate angle variation, selecting a candidate angle variation based on the probability weights, determining an updated beam angle by updating the beam angle based on the probability weights and the candidate angle variations, and determining updated beamforming weights for the plurality of antennas based on the updated beam angle.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A wireless communication device comprising:
   an output determiner configured to determine first weighted signals for a plurality of antennas with first beamforming weights;
   a selector configured to select, from the plurality of antennas, a reference antenna based on signal powers of the first weighted signals by determining signal powers of the first weighted signals and selecting, as the reference antenna, an antenna from the plurality of antennas that corresponds to the first weighted signal with a highest-value signal power;
   a weight controller configured to determine second beamforming weights for a predetermined number of antennas of the plurality of antennas based on a difference among the first weighted signal of the reference antenna and the first weighted signals of the predetermined number of antennas,
   the output determiner further configured to determine second weighted signals for the plurality of antennas with the second beamforming weights.

2. The wireless communication device of claim 1, wherein the weight controller is configured to determine the second beamforming weights based on the differences by updating a phase of the first beamforming weights for the predetermined number of antennas based on phase differences between the first weighted signal of the reference antenna and the first weighted signals of the remaining antennas to obtain the second beamforming weights.

3. The wireless communication device of claim 1, wherein the weight controller is configured to determine the second beamforming weights based on the differences by:
   determining a product of the first weighted signal of a first antenna of the predetermined number antennas and a complex conjugate of the first weighted signal of the reference antenna;
   determining an angle or an imaginary part of the product; and
   updating, based on the angle or imaginary part, a phase of the first beamforming weight for the first antenna to obtain the second beamforming weight for the first antenna.

4. The wireless communication device of claim 1, wherein the weight controller is further configured to set the second beamforming weight for the reference antenna to a reference value, and wherein the output determiner is configured to determine the second weighted signal for the reference antenna by determining the second weighted signal for the reference antenna with the reference value.

5. The wireless communication device of claim 1, wherein the output determiner is further configured to determine a beamformed output signal by combining the second weighted signals for the plurality of antennas.

6. A wireless communication device comprising:
   an output determiner configured to determine first weighted signals for a plurality of antennas with first beamforming weights and to determine a first beamformed output signal with the first weighted signals; and
   a weight controller configured to determine second beamforming weights for the plurality of antennas based on differences between the first weighted signals and the first beamformed output signal,
   the output determiner further configured to determine second weighted signals and a second beamformed output signal with the second beamforming weights.

7. The wireless communication device of claim 6, wherein the output determiner is configured to determine the second beamforming weights based on the differences by updating a phase of the first beamforming weights for the plurality of antennas based on phase differences between the first weighted signals and the first beamformed output signal.

8. The wireless communication device of claim 6, wherein the output determiner is configured to determine the second beamforming weights based on the differences by:
   determining a product of a respective first weighted signal of a first antenna of the plurality of antennas and a complex conjugate of the first beamformed output signal;
   determining an angle or an imaginary part of the product; and
   updating, based on the angle or imaginary part, a phase of the first beamforming weight for the first antenna to obtain the second beamforming weight for the first antenna.

9. The wireless communication device of claim 6, wherein the output determiner is configured to determine the second weighted signals and the second beamformed output signal with the second beamforming weights by:
   multiplying digital signals obtained from the plurality of antennas with respective second beamforming weights to obtain the second weighted signals; and
   summing the second weighted signals to obtain the second beamformed output signal.

10. A method of performing beamforming, the method comprising:
    determining first weighted signals for a plurality of antennas with first beamforming weights;
    selecting, from the plurality of antennas, a reference antenna based on signal powers of the first weighted signals by determining signal powers of the first weighted signals and selecting, as the reference antenna, an antenna from the plurality of antennas that corresponds to the first weighted signal with a highest-value signal power;
    determining second beamforming weights for a predetermined number of antennas of the plurality of antennas based on differences among the first weighted signal of the reference antenna and the first weighted signals of the predetermined number of antennas; and
    determining second weighted signals for the plurality of antennas with the second beamforming weights.

11. The method of claim 10, wherein determining the second beamforming weights based on the differences comprises:
    updating a phase of the first beamforming weights for the predetermined number of antennas based on phase differences between the first weighted signal of the reference antenna and the first weighted signals of the remaining antennas to obtain the second beamforming weights.

12. The method of claim 10, wherein determining the second beamforming weights based on the differences comprises:
  determining a product of the first weighted signal of a first antenna of the predetermined number of antennas and a complex conjugate of the first weighted signal of the reference antenna;
  determining an angle or an imaginary part of the product; and
  updating, based on the angle or imaginary part, a phase of the first beamforming weight for the first antenna to obtain the second beamforming weight for the first antenna.

13. The method of claim 10, further comprising setting the second beamforming weight for the reference antenna to a reference value, and wherein determining the second weighted signal for the reference antenna comprises determining the second weighted signal for the reference antenna with the reference value.

14. A wireless communication device comprising one or more processors configured to:
  determine first weighted signals for a plurality of antennas with first beamforming weights and to determine a first beamformed output signal with the first weighted signals;
  determine second beamforming weights for the plurality of antennas by determining differences between the first weighted signals and the first beamformed output signal; and
  determine second weighted signals and a second beamformed output signal with the second beamforming weights.

15. The wireless communication device of claim 14, the one or more processors further configured to determine the second beamforming weights by determining differences by updating a phase of the first beamforming weights for the plurality of antennas based on phase differences between the first weighted signals and the first beamformed output signal.

16. The wireless communication device of claim 14, the one or more processors configured to determine the second beamforming weights by determining differences by:
  determining a product of a respective first weighted signal of a first antenna of the plurality of antennas and a complex conjugate of the first beamformed output signal;
  determining an angle or an imaginary part of the product; and
  updating, based on the angle or imaginary part, a phase of the first beamforming weight for the first antenna to obtain the second beamforming weight for the first antenna.

* * * * *